(12) United States Patent
Kumar et al.

(10) Patent No.: US 9,073,294 B2
(45) Date of Patent: Jul. 7, 2015

(54) METHOD FOR SEALING A WATER-SOLUBLE FILM BY APPLYING A SEALING SOLUTION

(71) Applicant: MONOSOL, LLC, Merrillville, IN (US)

(72) Inventors: Sumeet Kumar, Crown Point, IN (US); Percy Bromby, II, Chicago, IL (US); David M. Lee, Crown Point, IN (US)

(73) Assignee: MONOSOL, LLC, Merrillville, IN (US)

(*) Notice: Subject to any disclaimer, the term of this patent is extended or adjusted under 35 U.S.C. 154(b) by 0 days.

(21) Appl. No.: 14/294,385

(22) Filed: Jun. 3, 2014

(65) Prior Publication Data

US 2014/0356603 A1 Dec. 4, 2014

Related U.S. Application Data

(60) Provisional application No. 61/830,969, filed on Jun. 4, 2013.

(51) Int. Cl.
*B65B 51/02* (2006.01)
*B65B 3/02* (2006.01)
(Continued)

(52) U.S. Cl.
CPC ............... *B32B 27/306* (2013.01); *B32B 27/08* (2013.01); *B32B 37/0076* (2013.01); *B32B 37/0038* (2013.01); *B32B 37/1292* (2013.01); *B32B 2250/03* (2013.01); *B32B 2250/40* (2013.01); *B32B 2037/1269* (2013.01); *B32B 2037/1276* (2013.01); *B32B 2307/7166* (2013.01); *B32B 2329/04* (2013.01); *B32B 2309/105* (2013.01); *Y10T 156/1036* (2015.01); *Y10T 428/24975* (2015.01); *B65D 65/46* (2013.01); *B65B 51/02* (2013.01); *C11D 17/042* (2013.01); *B65B 3/02* (2013.01); *B32B 27/30* (2013.01); *C08J 5/122* (2013.01); *C09J 5/00* (2013.01);

(Continued)

(58) Field of Classification Search
None
See application file for complete search history.

(56) References Cited

U.S. PATENT DOCUMENTS 3,596,428 A * 8/1971 Young et al. .................. 53/451
3,676,382 A   7/1972 Turbak et al.
(Continued)

FOREIGN PATENT DOCUMENTS

AU   2005201390   10/2006
DE   10305799    9/2004
(Continued)

OTHER PUBLICATIONS

"Physical Properties of Glycerine and its Solutions", Glycerine Producers' Association, 1963. 28 pages.
(Continued)

*Primary Examiner* — Stephen F Gerrity
(74) *Attorney, Agent, or Firm* — Marshall, Gerstein & Borun LLP

(57) ABSTRACT

Disclosed herein are sealing solutions for sealing water-soluble films, in particular aqueous mixtures including one or more polymeric solvents such as polyols. Aqueous sealing solutions including a relatively dilute solvent for one or more polymeric components of the water-soluble film (e.g., water-soluble polymeric components thereof, such as polyvinyl alcohol (PVOH)) can exhibit one or more benefits, including a reduction in dissolution of the film by the sealing solution and an increase in seal strength. Also disclosed are sealed articles formed with the sealing solutions, for example water-soluble packets containing various liquid or solid compositions.

29 Claims, 12 Drawing Sheets

(51) Int. Cl.

| | | |
|---|---|---|
| *B32B 27/30* | (2006.01) | |
| *B32B 27/08* | (2006.01) | |
| *B32B 37/00* | (2006.01) | |
| *B32B 37/12* | (2006.01) | |
| *B65D 65/46* | (2006.01) | |
| *C11D 17/04* | (2006.01) | |
| *C08J 5/12* | (2006.01) | |
| *C09J 5/00* | (2006.01) | |

(52) U.S. Cl.
CPC ......... *C08J 2300/14* (2013.01); *C08J 2329/04* (2013.01); *C09J 2429/006* (2013.01)

(56) References Cited

U.S. PATENT DOCUMENTS

| | | | |
|---|---|---|---|
| 3,964,832 A | 6/1976 | Cohen et al. | |
| 4,115,292 A | 9/1978 | Richardson et al. | |
| 4,176,079 A | 11/1979 | Guerry et al. | |
| 4,267,145 A * | 5/1981 | Wysong | 264/563 |
| 4,416,791 A * | 11/1983 | Haq | 510/296 |
| 4,536,532 A | 8/1985 | Miller et al. | |
| 4,539,060 A | 9/1985 | Wittwer et al. | |
| 5,500,067 A | 3/1996 | Jenkner | |
| 5,688,845 A | 11/1997 | Eden et al. | |
| 5,743,920 A | 4/1998 | Kohan | |
| 6,989,072 B2 | 1/2006 | Catlin et al. | |
| 7,528,099 B2 | 5/2009 | Wahl et al. | |
| 8,071,123 B2 | 12/2011 | Hayashi et al. | |
| 2002/0187181 A1 | 12/2002 | Godbey et al. | |
| 2003/0022974 A1 | 1/2003 | Tai et al. | |
| 2003/0034126 A1 * | 2/2003 | Catlin et al. | 156/308.6 |
| 2003/0050208 A1 | 3/2003 | Duquet et al. | |
| 2003/0108705 A1 | 6/2003 | Duffield et al. | |
| 2003/0152619 A1 | 8/2003 | Stevens et al. | |
| 2003/0194415 A1 | 10/2003 | Wang et al. | |
| 2003/0223657 A1 | 12/2003 | Belias et al. | |
| 2003/0228433 A1 | 12/2003 | Duffield | |
| 2004/0029764 A1 * | 2/2004 | Weber et al. | 510/446 |
| 2004/0035739 A1 | 2/2004 | Hammond et al. | |
| 2004/0182049 A1 * | 9/2004 | Duffield | 53/452 |
| 2005/0042443 A1 | 2/2005 | Miller | |
| 2005/0075258 A1 * | 4/2005 | Kessler et al. | 510/221 |
| 2005/0205574 A1 * | 9/2005 | Lambotte et al. | 220/234 |
| 2006/0062830 A1 | 3/2006 | Hayashi et al. | |
| 2006/0127425 A1 | 6/2006 | Walls et al. | |
| 2006/0217288 A1 | 9/2006 | Wahl et al. | |
| 2007/0079454 A1 | 4/2007 | Duffield | |
| 2007/0266901 A1 | 11/2007 | Rance et al. | |
| 2007/0287653 A1 * | 12/2007 | Barthel et al. | 510/447 |
| 2007/0292481 A1 | 12/2007 | Hoffman et al. | |
| 2009/0032427 A1 | 2/2009 | Cheu et al. | |
| 2010/0022565 A1 * | 1/2010 | Buhl et al. | 514/266.2 |
| 2010/0068350 A1 * | 3/2010 | Shen et al. | 426/96 |
| 2010/0092525 A1 | 4/2010 | Hardy et al. | |
| 2010/0167971 A1 | 7/2010 | Glenn, Jr. et al. | |
| 2010/0283178 A1 | 11/2010 | Kolter | |
| 2011/0189413 A1 | 8/2011 | Denome et al. | |
| 2011/0190318 A1 | 8/2011 | Messerschmid et al. | |
| 2011/0290694 A1 | 12/2011 | Fuisz et al. | |
| 2012/0130331 A1 | 5/2012 | Wang et al. | |
| 2012/0235329 A1 | 9/2012 | Fowler et al. | |
| 2012/0294893 A1 | 11/2012 | Asari et al. | |
| 2012/0306126 A1 | 12/2012 | Fuss et al. | |
| 2014/0199460 A1 | 7/2014 | Lee et al. | |

FOREIGN PATENT DOCUMENTS

| | | |
|---|---|---|
| DE | 10313453 | 10/2004 |
| EP | 0892744 | 1/1999 |
| GB | 2392914 | 3/2004 |
| GB | 2440706 | 2/2008 |
| JP | 2011-173976 | 9/2011 |
| WO | WO-01/07560 | 2/2001 |
| WO | WO-01/40432 | 6/2001 |
| WO | WO-03/008513 | 1/2003 |
| WO | WO-2004/009335 | 1/2004 |
| WO | WO-2005/030653 | 4/2005 |
| WO | WO-2005/121225 A1 | 12/2005 |
| WO | WO-2007/010553 A2 | 1/2007 |
| WO | WO-2008/068779 A2 | 6/2008 |
| WO | WO-2013/015545 A1 | 1/2013 |
| ZA | 9702926 A | 11/1997 |

OTHER PUBLICATIONS

Hansen, Hansen Solubility Parameters a Users Handbook, Second Edition, CRC Press, Taylor and Francis Group, Boca Raton, FL, 2007. 19 pages.

Houlder, "The solution to a sticky problem," *Financial Times* [London (UK)] May 6, 1999: 18. 2 pages.

Johnson, "Designing With a Water Soluble Material", Medical Design News (Sep. 1, 2008). 3 pages.

Uramatsu et al., Development of PVA Copolymer Capsules, PharmTech Europe (Apr. 1, 2004). 4 pages.

International Search Report and Written Opinion, corresponding International Application No. PCT/US2014/040593, dated Oct. 23, 2014. 11 pages.

\* cited by examiner (a)

(b)

(a)

(b)

(a)

(b)

METHOD FOR SEALING A WATER-SOLUBLE FILM BY APPLYING A SEALING SOLUTION

CROSS REFERENCE TO RELATED APPLICATION

Priority is claimed to U.S. Provisional Application No. 61/830,969 (filed on Jun. 4, 2013), which is incorporated herein by reference in its entirety.

FIELD OF THE DISCLOSURE

The present disclosure relates generally to water-soluble films. More particularly, the disclosure relates to sealing solutions for sealing water-soluble films, in particular low-viscosity aqueous mixtures including one or more polymeric solvents such as polyols, which solutions can be used to form sealed water-soluble articles containing various compositions.

BACKGROUND

Water-soluble films are well known in the art. Water-soluble films have many applications, including non-edible forms, such as packaging, and edible forms, wherein the film itself is or contains an edible article. Edible films are known for uses such as delivery of therapeutic agents, breath freshening agents, food ingredients including but not limited to baking ingredients such as dough modifiers and flavors. The films can be formed into water-soluble packets for storing or delivering various compositions, edible or non-edible.

Common methods for sealing water-soluble films formed into packets or pouches include heat sealing and solution sealing. With heat sealing, pouches may be formed by placing two sheets of water-soluble film together, heat-sealing three edges, filling with a suitable composition, and then heat-sealing the forth edge to form a sealed pouch. In a solution sealing process, solvent is applied to the film material to form a seal between the solvated film and another film. Water is a common solvent for solution sealing of water-soluble pouches because it is low cost, non-toxic, and readily available such that, when applied at appropriate levels, it can result in strong seals which prevent solid/liquid leakage from the resulting pouch.

While solution sealing can have advantages over heat sealing, solution sealing has been found unsuitable for many water-soluble films. Some water-soluble films may form solution seals with insufficient strength to maintain structural integrity during their useful lives. In other cases, the water-soluble film may be relatively susceptible to rapid dissolution by the sealing solution, thus destroying the film and/or preventing seal formation with sufficient strength. For example, on rapidly dissolving water-soluble films such as polyvinyl alcohol, water can be too aggressive in dissolving the film, resulting in film burn-through and preventing quality seal formation. For some water-soluble films, in particular for thin films such as 1.5 mil-thick films, there is no known method or corresponding sealing solution for effectively sealing the films.

SUMMARY

The disclosure generally relates to sealing solutions for sealing water-soluble films, in particular aqueous mixtures including one or more polymeric solvents such as polyols. It has been found that aqueous sealing solutions including a relatively dilute solvent for one or more polymeric components of the water-soluble film (e.g., water-soluble polymeric components thereof, such as polyvinyl alcohol (PVOH)) can exhibit one or more benefits, including a reduction in dissolution of the film by the sealing solution (e.g., relative to water alone, such as represented by an increased characteristic burn-through time), an increase in seal strength (e.g., relative to a seal formed by water alone, such as represented by a characteristic peel strength), and embodiments including a combination of such benefits.

One aspect of the disclosure relates to a method for sealing a water-soluble film, the method including: (a) applying a sealing solution to a first surface of a water-soluble film, the sealing solution including (i) water, and (ii) a polyol having 3 or more hydroxyl groups, wherein the sealing solution has a dynamic viscosity ($\mu_s$) less than 1.5 cP as measured at 20° C.; and (b) contacting a second surface of a water-soluble film with the sealing solution on the first surface for a time sufficient to form a seal between the first surface and the second surface.

Another aspect of the disclosure relates to a method for sealing a water-soluble film, the method including: (a) applying a sealing solution to a first surface of a water-soluble film having an initial thickness less than about 50 μm and including a polyvinyl alcohol copolymer consisting essentially of vinyl alcohol monomeric repeat units and vinyl acetate monomeric repeat units, the sealing solution including (i) water, and (ii) a polyol present in the sealing solution in an amount ranging from about 2 wt. % to about 15 wt. %, the polyol being selected from the group consisting of glycerol, erythritol, threitol, arabitol, xylitol, ribitol, mannitol, sorbitol, galactitol, fucitol, iditol, inositol, volemitol, isomalt, maltitol, lactitol, and combinations thereof, wherein the sealing solution has a dynamic viscosity ($\mu_s$) less than 1.5 cP as measured at 20° C.; and (b) contacting a second surface of a water-soluble film having an initial thickness less than about 50 μm and including a polyvinyl alcohol copolymer consisting essentially of vinyl alcohol monomeric repeat units and vinyl acetate monomeric repeat units with the sealing solution on the first surface for a time sufficient to form a seal between the first surface and the second surface.

Another aspect of the disclosure relates to a method for sealing a water-soluble film, the method including: (a) applying a sealing solution to a first surface of a water-soluble film, the sealing solution including (i) water, and (ii) a solvent for at least one polymeric component of the water-soluble film, wherein (A) the solvent and the polymeric component have a solubility radius (Ra) of about 5 or less as defined by equation (I):

$$(Ra)^2 = 4(\delta_{D,S} - \delta_{D,P})^2 + (\delta_{P,S} - \delta_{P,P})^2 + (\delta_{H,S} - \delta_{H,P})^2 \quad (I)$$

where $\delta_{D,S}$ is the solvent dispersive force, $\delta_{D,P}$ is the polymeric component dispersive force, $\delta_{P,S}$ is the solvent polar force, $\delta_{P,P}$ is the polymeric component polar force, $\delta_{H,S}$ is the solvent hydrogen bonding force, and $\delta_{H,P}$ is the polymeric component hydrogen bonding force, each of which is determined by a consistent method of Hansen solubility parameter evaluation, and (B) the sealing solution has a dynamic viscosity ($\mu_s$) less than 1.5 cP as measured at 20° C.; and (b) contacting a second surface of a water-soluble film with the sealing solution on the first surface for a time sufficient to form a seal between the first surface and the second surface.

In another aspect, the disclosure relates to a method for forming a sealed water-soluble packet containing a composition, the method including: performing a method for sealing a water-soluble film according to any of the disclosed embodiments, wherein (i) the water-soluble film of at least one of the first surface and the second surface defines a volume at least partially enclosing a composition, and (ii) forming the seal creates the sealed water-soluble packet containing the composition.

In another aspect, the disclosure relates to an article such as a sealed water-soluble packet, the article including: (a) a first surface of a water-soluble film sealed to a second surface of a water-soluble film at an interfacial region between the first surface and the second surface; and (b) a polyol having 3 or more hydroxyl groups present in the interfacial region at a local concentration substantially higher than a bulk concentration of the polyol in the water-soluble film and outside of the interfacial region.

In another aspect, the disclosure relates to an article such as a sealed water-soluble packet, the article including: (a) a first surface of a water-soluble film sealed to a second surface of a water-soluble film at an interfacial region between the first surface and the second surface, wherein the water-soluble film for each of the first surface and the second surface has an initial thickness less than about 50 µm and includes a polyvinyl alcohol copolymer consisting essentially of vinyl alcohol monomeric repeat units and vinyl acetate monomeric repeat units; and (b) a polyol present in the interfacial region at a local concentration substantially higher than a bulk concentration of the polyol in the water-soluble film and outside of the interfacial region, the polyol being selected from the group consisting of glycerol, erythritol, threitol, arabitol, xylitol, ribitol, mannitol, sorbitol, galactitol, fucitol, iditol, inositol, volemitol, isomalt, maltitol, lactitol, and combinations thereof.

In another aspect, the disclosure relates to an article such as a sealed water-soluble packet, the article including: (a) a first surface of a water-soluble film sealed to a second surface of a water-soluble film at an interfacial region between the first surface and the second surface; and (b) a solvent for at least one polymeric component of the water-soluble film present in the interfacial region at a local concentration substantially higher than a bulk concentration of the solvent in the water-soluble film and outside of the interfacial region, wherein the solvent and the polymeric component have a solubility radius (Ra) of about 5 or less as defined by equation (I):

$$(Ra)^2 = 4(\delta_{D,S} - \delta_{D,P})^2 + (\delta_{P,S} - \delta_{P,P})^2 + (\delta_{H,S} - \delta_{H,P})^2 \quad (I)$$

where $\delta_{D,S}$ is the solvent dispersive force, $\delta_{D,P}$ is the polymeric component dispersive force, $\delta_{P,S}$ is the solvent polar force, $\delta_{P,P}$ is the polymeric component polar force, $\delta_{H,S}$ is the solvent hydrogen bonding force, and $\delta_{H,P}$ is the polymeric component hydrogen bonding force, each of which is determined by a consistent method of Hansen solubility parameter evaluation.

Optionally, the water-soluble films of each aspect can be formed (e.g., thermoformed) into a pouch, for example so that the pouch can be filled with a suitable composition and subsequently sealed into a water-soluble packet containing the composition using the disclosed solvent sealing solutions and related methods.

Further aspects and advantages will be apparent to those of ordinary skill in the art from a review of the following detailed description and accompanying drawings. While the compositions and methods are susceptible of embodiments in various forms, the description hereafter includes specific embodiments with the understanding that the disclosure is illustrative, and is not intended to limit the invention to the specific embodiments described herein.

DESCRIPTION OF THE DRAWINGS

The following detailed description of the various disclosed methods, processes, compositions, and articles refers to the accompanying drawings in which.

DETAILED DESCRIPTION

Figure 1:
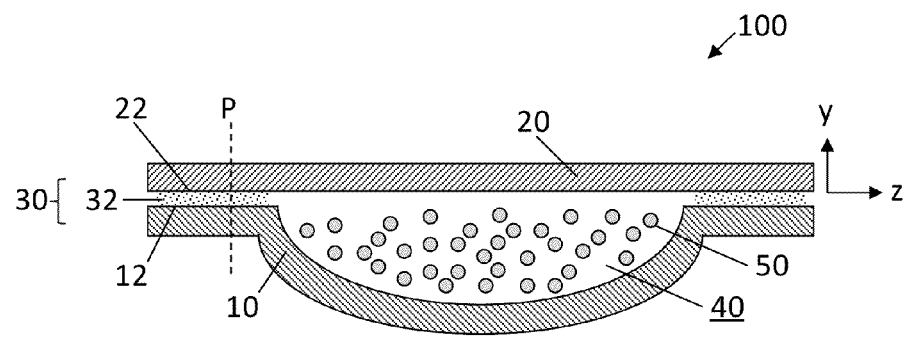
FIG. 1 is a side cross-sectional view of a sealed water-soluble packet, which illustrates corresponding methods for sealing a water-soluble film according to the disclosure.

Disclosed herein are sealing solutions for sealing water-soluble films. The sealing solutions include water and a solvent for one or more polymeric components of the water-soluble film to be sealed. As used in the context of the sealing solution, a "solvent" refers to a compound generally capable of forming a liquid or solid solution with the polymeric component of the film. As described below, an extent of solubility between the solvent and polymeric component can be characterized by a solubility radius parameter. The solvent need not necessarily be a liquid at room temperature or seal-forming temperature (e.g., it can be a liquid or solid at such temperatures). The solvent suitably is soluble in water at the concentration used in the sealing solution. Examples of suitable solvents include polyols having 3 or more hydroxyl (—OH) groups, for example for soluble films including polyvinyl alcohol or other water-soluble polymer components.

The aqueous sealing solution suitably includes one or more such solvents at relatively dilute concentrations, generally resulting in a sealing solution viscosity at or near (e.g., slightly above) that of water. Even at a relatively dilute solvent concentration, the aqueous sealing solution can exhibit one or more benefits relative to water alone as a sealant, including a reduction in dissolution of the film by the sealing solution and an increase in seal strength. In some cases, the sealing solution can permit the formation of seal for a particular film where no solution seal would otherwise be possible using water alone (e.g., providing a sufficient increase in burn-though time to permit the formation of a complete seal, even though such seal might have a relatively low absolute seal strength limiting its use in certain applications). The disclosed sealing solutions and corresponding methods can be used to form various sealed articles, for example sealed water-soluble packets containing various compositions such as human and animal ingestible items, personal care compositions and cleaning compositions.

The sealing solution, sealed films, and related methods are contemplated to include embodiments including any combination of one or more of the additional optional elements, features, and steps further described below (including those shown in the figures and Examples), unless stated otherwise.

As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer") further includes copolymers having a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units.

As used herein, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of PVOH, the term "copolymer" (or "PVOH copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units). In the limiting case of 100% hydrolysis, a PVOH copolymer can include a copolymer having vinyl alcohol units and one or more other monomer units, but no vinyl acetate units.

As used herein, the term "comprising" indicates the potential inclusion of other agents, elements, steps, or features, in addition to those specified.

As used herein, "favorable solubility" refers to a film according to the disclosure herein that, at about 2.0 mils thick, completely dissolves in less than 50 seconds, preferably less than 40 and most preferably less than 30 seconds in water at 23° C.

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble polymer (or resin; whether PVOH or otherwise) in the water-soluble film.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

Sealing Solution

The sealing solution includes water and a solvent for one or more polymeric components of the water-soluble film, generally in the form of an aqueous solution. In one type of embodiment, the sealing solution includes water and a solvent for the primary polymeric component of the water-soluble film (e.g. highest concentration polymeric component, by weight, based on the entire weight of the film). As noted above, the solvent can be a liquid or solid in its natural state at typical sealing temperatures, and it is capable of forming a liquid or solid solution with its corresponding polymeric component(s) of the water-soluble film. The sealing solution can include more than one solvent, for example where multiple solvents are selected for their compatibility with a particular polymeric component. Alternatively or additionally, multiple solvents can be used when the water-soluble film has multiple polymeric components (e.g., where different solvents are selected for their solubility characteristics with respect to different polymeric components).

The sealing solution has been found to be effective as a relatively dilute aqueous solvent solution, both in terms of its ability to increase burn-through resistance and increase seal strength. For example, solvent concentration ranges of about 2 wt. % to about 15 wt. % or about 5 wt. % to about 10 wt. % in the sealing solution can be effective. More generally, the solvent can be present at levels of at least about 2, 4, 5, 8, or 10 wt. % and/or up to about 8, 10, 12, 15, 20, 30, 40, or 50 wt. % relative to the total sealing solution. The foregoing amounts and ranges can apply individually to specific solvents or collectively to all solvents when more than one type of solvent is included in the sealing solution. Analogous to the solvent, water concentration ranges of about 85 wt. % to about 95 wt. % or about 90 wt. % to about 95 wt. % in the sealing solution can be effective. More generally, water can be present at levels of at least about 50, 60, 70, 80, 88, 90, or 92 wt. % and/or up to about 90, 92, 95, 96, or 98 wt. % relative to the total sealing solution. Alternatively or additionally, the relatively dilute nature of the sealing solution can be reflected by the dynamic viscosity of the sealing solution ($\mu_s$), which is generally at or near (e.g., slightly above) the viscosity of water at a corresponding temperature. For example, a suitable sealing solution viscosity at a 20° C. reference temperature can be less than 1.5 cP or range from about 1 cP to about 1.4 cP or 1.45 cP (e.g., more generally being at least about 0.5, 1, 1.1, or 1.2 cP and/or up to about 1.1, 1.2, 1.3, 1.4, or 1.45 cP). At different reference temperatures ($T_{ref}$), the sealing solution viscosity ($\mu_s$) relative to the corresponding water viscosity ($\mu_w$) can alternatively be expressed as a ratio ($\mu_s/\mu_w$) of less than 1.5 (e.g., more generally being at least about 0.5, 1, 1.1, or 1.2 and/or up to about 1.1, 1.2, 1.3, 1.4, or 1.45).

The specific solvents of the sealing solution are not particularly limited, and they generally include small organic molecules having one or more (e.g., at least 2 or 3 or more) polar functional groups (e.g., oxygen- or nitrogen-containing groups, such as hydroxyl groups or (1°, 2°, or 3°) amino groups) which promote the solvent's compatibility with the aqueous sealing solution medium and polar functional groups of the polymeric component in the water-soluble film, where such polymeric functional groups can be the same or different from those in the solvent. A specific solvent can contain 2 to 12 carbon atoms (e.g., 3 to 6, 8, or 10 carbon atoms, such as 3, 4, 5, or 6 carbon atoms). Alternatively or additionally the solvent can contain 2 or 3 to 12 polar functional groups (e.g., 2 or 3 to 6, 8, or 10 polar groups, such as 3, 4, 5, or 6 polar groups), whether hydroxyl, amino, otherwise, or a combination thereof. In certain embodiments, the solvent can be a suitable plasticizer for the polymeric component(s) of the water-soluble film, whether or not the selected solvent is present as such in a particular film to be sealed.

Polyols having 3 or more hydroxyl groups (—OH) represent a suitable class of solvents for various water-soluble films. For example, polyols are suitable for water-soluble films containing PVOH (e.g., homopolymers thereof) as the sole or major polymeric component (e.g., at least about 50, 60, 75, 85, or 95 wt. % relative to the film as a whole or all polymeric components thereof). Examples of suitable polyols include various sugar alcohols including glycerin (glycerol), erythritol, threitol, arabitol, xylitol, ribitol, mannitol, sorbitol, galactitol, fucitol, iditol, inositol, volemitol, isomalt, maltitol, lactitol, and combinations thereof. Such polyols at relatively low concentrations in water (e.g., about 2 wt. % to about 15 wt. %. or about 5 wt. % to about 10 wt. %) generally exhibit low sealing solution viscosities. For example, 5 wt. % and 10 wt. % glycerin-in-water solutions have viscosities of about 1.2 cP and about 1.3 cP, respectively. Examples of suitable amino-functional solvents for various water-soluble films (e.g., with amino-functional components or otherwise) include linear (poly)ethyleneamines including ethylenediamine, diethylenetriamine (DETA), and triethylenetetramine (TETA).

As illustrated in the examples below, in one class of embodiments, a solvent can be selected and characterized based on its polymeric compatibility in terms of a Hansen solubility radius (Ra) parameter. Hansen solubility parameters (HSP) are a recognized tool for understanding and identifying relatively good and poor solvents for many materials, including polymers. The solubility characteristics of a material can be characterized by three individual forces: dispersive forces ($\delta_D$), polar forces ($\delta_P$), and hydrogen bonding forces ($\delta_H$). The individual forces can be combined into a total cohesive energy value ($\delta_T$) as shown in Equation 1:

$$(\delta_T)^2 = (\delta_D)^2 + (\delta_P)^2 + (\delta_H)^2. \quad (1)$$

In addition to representative solubility parameters for a single component, a solubility radius (Ra) can be used to characterize the relative solubility of two materials with respect to each other. For the specific case of sealing solution solvent (S) and a water-soluble film polymeric component (P), the solubility radius (Ra) can be expressed as shown in Equation 2:

$$(Ra)^2 = 4(\delta_{D,S} - \delta_{D,P})^2 + (\delta_{P,S} - \delta_{P,P})^2 + (\delta_{H,S} - \delta_{H,P})^2. \quad (2)$$

In Equation 2, $\delta_{D,S}$ is the solvent dispersive force, $\delta_{D,P}$ is the polymeric component dispersive force, $\delta_{P,S}$ is the solvent polar force, $\delta_{P,P}$ is the polymeric component polar force, $\delta_{H,S}$ is the solvent hydrogen bonding force, and $\delta_{H,P}$ is the polymeric component hydrogen bonding force. If the solubility radius (or distance) between two materials is 0, then they have the same $\delta_D$, $\delta_P$, and $\delta_H$ coordinates, and they are soluble in each other. The further apart they are, the less likely they are to be soluble in each in each other. Calculations for evaluating the various HSP values can be performed using a commercially available software package such as HSPIP (available from the Hansen Solubility Parameters internet site, currently in the 4$^{th}$ edition). Experimentally good solvents and poor solvents can be tested, and the HSP coordinates $\delta_D$, $\delta_P$, and $\delta_H$ for a material can be experimentally determined. Alternatively, the individual HSP coordinates $\delta_D$, $\delta_P$, and $\delta_H$ can be computed using the Y-MB methodology (included in the HSPIP software). Regardless of the method selected for HSP parameter estimation, a consistent method is suitably used for all solvents and polymeric components of interest.

The solubility radius between the sealing solution solvent and at least one (water-soluble) polymeric component in the water-soluble film is suitably small, for example about 5 or less. In various embodiments, the solubility radius suitably ranges from about 1 to about 5, or, more generally, can be at least about 1, 2, or 3 and/or up to about 4, 4.5, or 5. In cases where the sealing solution includes more than one solvent, each of the solvents suitably has a solubility radius of about 5 or less with respect to a water-soluble polymeric component in the water-soluble film. In cases where the water-soluble film includes more than one water-soluble polymeric component, the solvent suitably has a solubility radius of about 5 or less with respect to at least one of the water-soluble polymeric components and optionally with respect to the primary water-soluble polymeric component. In embodiments, the solvent can have a solubility radius of about 5 or less with respect to the majority of the water-soluble polymeric components. In embodiments, the solvent can have a solubility radius of about 5 or less with respect to all water-soluble polymeric components. Where there are multiple solvents and water-soluble polymeric components, individual solvents can be selected for solubility compatibility with at least one water-soluble polymeric component. For example, in one type of embodiment all water-soluble polymeric components have at least one corresponding compatible solvent in the sealing solution. While the foregoing values and ranges for the solubility radius may be used independently of the particular solvent and water-soluble polymeric component to characterize the compatibility of a particular solvent-polymer pair, suitable HSP coordinate values for PVOH/polyol systems include (a) a $\delta_{P,S}$ value of at least about 10 and/or up to about 12 or 15, and/or (b) a $\delta_{H,S}$ value of at least about 22 or 25 and/or up to about 30 or 33.

The sealing solution is suitably a mixture including water and the solvent(s) as its only or major components. In optional embodiments, additional additives may be present in small amounts (e.g., up to about 1 wt. % or 2 wt. %, such as about 0.01 wt. % to about 2 wt. % or about 0.1 wt. % to about 1 wt. %). For example, a surfactant (e.g., those described below for inclusion in the water-soluble film) may be added to improve the wetting properties of the sealing solution as it is applied to a film surface prior to sealing. The sealing solution can be free of added water-soluble polymers (e.g., whether as water-soluble film-forming polymers, as components of the water-soluble film, or otherwise); however, some resin or polymer may be present at equilibrium or contamination values based on the accumulation of residual amounts of the resin or polymer in the forming and/or sealing equipment during film processing. In other, non-exclusive optional embodiments, the sealing solution can further include a plasticizing additive other than the solvents (e.g., polyols) described above, for example at levels less than and/or comparable to those for the solvent. Examples include various organic diols and/or glycols such as 1,2-ethanediol (ethylene glycol), 1,3-propanediol, 1,2-propanediol, 1,4-butanediol (tetramethylene glycol), 1,5-pantanediol (pentamethylene glycol), 1,6-hexanediol (hexamethylene glycol), 2,3-butanediol, 1,3-butanediol, 2-methyl-1,3-propanediol, various polyethylene glycols (e.g., diethylene glycol, triethylene glycol), and combinations thereof.

Water-Soluble Films

Water-soluble films, optional ingredients for use therein, and methods of making the same are well known in the art. In one class of embodiments, the water-soluble film includes polyvinyl alcohol (PVOH), including homopolymers thereof (e.g., including substantially only vinyl alcohol and vinyl acetate monomer units) and copolymers thereof (e.g., including one or more other monomer units in addition to vinyl alcohol and vinyl acetate units). PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold or hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis (DH) of the PVOH included in the water-soluble films of the present disclosure can be about 75% to about 99%. As the degree of hydrolysis is reduced, a film made from the resin will have reduced mechanical strength but faster solubility at temperatures below about 20° C. As the degree of hydrolysis increases, a film made from the resin will tend to be mechanically stronger and the thermoformability will tend to decrease. The degree of hydrolysis of the PVOH can be chosen such that the water-solubility of the resin is temperature dependent, and thus the solubility of a film made from the resin, compatibilizer polymer, and additional ingredients is also influenced. In one class of embodiments the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another class of embodiments the film is hot water-soluble. For example, a hot water-soluble film is advantageous for edible applications such as water-soluble packets enclosing a hot food item, e.g. oatmeal, cocoa, or soup mix. A hot water-soluble film, soluble in water at a temperature of at least about 60° C., can include PVOH with a degree of hydrolysis of at least about 98%. In some embodiments, the film is intended to by edible, for example by humans. In such cases, the particular degree of hydrolysis may be selected to conform with local, state, or federal laws or regulations relating to approved degrees of hydrolysis for human or other animal consumption. For example, the skilled artisan will recognize that PVOH film approved for human consumption (currently) includes those with nominally an 88% degree of hydrolysis, for example a degree of hydrolysis of about 86.5% to about 89%.

Other film-forming, water soluble resins for use in addition to or in an alternative to PVOH can include, but are not limited to modified polyvinyl alcohols, polyacrylates, water-soluble acrylate copolymers, polyvinyl pyrrolidone, polyethyleneimine, pullulan, water-soluble natural polymers including, but not limited to, guar gum, xanthan gum, carrageenan, and starch, water-soluble polymer derivatives including, but not limited to, ethoxylated starch and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, and polymethacrylates. Such water-soluble, film-forming resins, whether PVOH or otherwise are commercially available from a variety of sources. In general, the water-soluble film can include copolymers and/or blends of the foregoing resins.

The water-soluble, film-forming polymers can be included in the film composition in an amount in a range of about 30 wt. % to about 90 wt. %, for example. The weight ratio of the amount of the water-soluble polymer as compared to the combined amount of all plasticizers, compatibilizing agents, and secondary additives can be in a range of about 0.5 to about 9, about 0.5 to about 5, or about 1 to 3, or about 1 to 2, for example.

Water-soluble polymers for use in the films described herein (including, but not limited to PVOH polymers) can be characterized by a viscosity in a range of about 3.0 to about 27.0 cP, or about 3.0 cP to about 15 cP, or about 6.0 to about 10.0 cP. The viscosity of a PVOH polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise.

It is well known in the art that the viscosity of a water-soluble polymer (PVOH or otherwise) is correlated with the weight-average molecular weight ($\overline{M}w$) of the same polymer, and often the viscosity is used as a proxy for $\overline{M}w$. Thus, the weight-average molecular weight of the water-soluble, film-forming polymer can be in a range of about 30,000 to about 175,000, or about 30,000 to about 100,000, or about 55,000 to about 80,000.

The water-soluble film can contain other auxiliary agents and processing agents, such as, but not limited to, plasticizers, plasticizer compatibilizers, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), and other functional ingredients, in amounts suitable for their intended purposes. Embodiments including plasticizers are preferred. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively.

The plasticizer can include, but is not limited to, glycerin, diglycerin, ethylene glycol, diethylene glycol, triethylene glycol, tetraethylene glycol, propylene glycol, polyethylene glycols up to 400 MW, neopentyl glycol, trimethylolpropane, polyether polyols, 2-methyl-1,3-propanediol, lactic acid, ethanolamines, and a mixture thereof. Such plasticizers (e.g., whether in liquid form at room temperature or otherwise) can be included in the water-soluble films in amounts ranging from about 25 phr to about 50 phr, about 30 phr to about 45 phr, or about 35 phr to about 40 phr, whether for a single plasticizer or a combination of plasticizers. In various embodiments, the water-soluble film can alternatively or additionally include sugar alcohol plasticizers that are solid at room temperature, for example including isomalt, maltitol, sorbitol, xylitol, erythritol, adonitol, dulcitol, pentaerythritol, mannitol and combinations thereof. The sugar alcohol plasticizers can be included in the water-soluble films in amounts ranging from about 5 phr to about 35 phr, about 5 phr to about 25 phr, about 10 phr to about 20 phr, or about 10 phr to about 15 phr, whether for a single sugar alcohol plasticizer or a combination of sugar alcohol plasticizers. The total amount of the plasticizer (e.g., liquid, solid, sugar alcohol, or otherwise) can be in a range of about 10 wt. % to about 40 wt. %, or about 15 wt. % to about 35 wt. %, or about 20 wt. % to about 30 wt. %, for example about 25 wt. %.

Water-soluble films of the present disclosure can include a compatibilizing agent for the sugar alcohol plasticizer that is a solid at room temperature. The compatibilizing agent can be included in the water-soluble films in amounts ranging from about 10 phr to about 25 phr, about 13 phr to about 22 phr, or about 15 phr to about 20 phr, whether for a single compatibilizing agent or a combination of compatibilizing agents. The amount of compatibilizing agent alternatively or additionally can be expressed as ratio ranging from about 2:1 to about 1:2 relative to the sugar alcohol plasticizer. Suitable compatibilizers include, but are not limited to, cellulose ethers such as methylcellulose, hydroxypropyl methylcellulose, carboxymethyl cellulose, salts thereof, polysaccharides of pectin, polysaccharides of sodium alginate, modified starches such as acid-modified, hydroxypropylated starches (e.g., Pure-Cote B760 or B790 available from Grain Processing Corporation, Muscatine, Iowa), hydroxyethyl starches (e.g., Ethylex 2035 available from Tate & Lyle Ingredients Americas LLC, 2200 E. Eldorado Street, Decater, Ill.), and combinations of any of the foregoing. In one class of embodiments, the compatibilizer comprises sodium carboxymethyl cellulose (CMC). The degree of substitution of the CMC can be from about 0.60 to about 0.95, for example. As used herein, "degree of substitution" refers to the number of hydroxyl groups that have been substituted with a sodium carboxymethyl group ($CH_2COO(Na)$) per monomer unit. In one type of embodiment, the viscosity of a 2% aqueous solution of CMC is in a range of about 20 to about 80 cP, as measured at 25° C. on a Brookfield LVT viscometer. In another class of embodiments, the compatibilizer comprises a hydroxypropylated starch. In one type of embodiment, the hydroxypropylated starch can have a 9.1% moisture content, a pH of about 6.3, an ash content of 0.20 wt. % and a protein content of 0.173 wt. %. In another class of embodiments, the compatibilizing agent comprises a hydroxyethyl starch. The level of ethoxylation can be from about 2 wt. % to about 3 wt. %, for example, as the total weight of the substituent units divided by the total weight of the polymer.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. In various embodiments, the amount of surfactant in the water-soluble film is in a range of about 0.1 wt % to 2.5 wt %, optionally about 1.0 wt % to 2.0 wt %.

The water-soluble film can further have a residual moisture content of at least 4 wt. %, for example in a range of about 4 to about 10 wt. %, as measured by Karl Fischer titration.

Other features of water-soluble films may be found in U.S. Publication No. 2011/0189413 and U.S. application Ser. No. 13/740,053, both of which are incorporated by reference herein in their entireties.

A class of embodiments of the water-soluble films according to the present disclosure is characterized by the water-soluble film being edible, for example when including sugar alcohol plasticizers and compatibilizers therefor. In this class of embodiments the water-soluble polymers can include, can consist essentially of, or can consist of one or more of PVOH, modified PVOH, water-soluble natural polymers including, but not limited to, guar gum, xanthan gum, carrageenan, and starch, water-soluble polymer derivatives including, but not limited to, ethoxylated starch and hydroxypropylated starch, copolymers of the forgoing, and combinations of the forgoing. Optional ingredients for inclusion in water-soluble films according to the disclosure include one or more of plasticizers that are liquid at room temperature, surfactants, compatibilizers, co-polymers, and co-film formers, for example. Liquid plasticizers can include, consist essentially of, or consist of one or more of glycerol, diglycerol, propylene glycol, low molecular weight polyethylene glycol (e.g., having a liquid consistency, for example having a molecular weight such as 200, 300, and 600), monoacetin, triacetin, triethyl citrate, and 1,3-butanediol. Surfactants can include, consist essentially of, or consist of dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, for example. Film formers can include, consist essentially of, or consist of one or more of pullulan, pectin, starch, gelatin, sodium alginates and modified starches. Other optional ingredients will be apparent to one of ordinary skill in the art in view of the present disclosure. Components for inclusion in edible water soluble films can be those designated as "Generally Recognized as Safe" (GRAS) by the United States Food and Drug Administration, and/or components with assigned, allowable E-numbers in the European Union, and/or components that are not yet designated as GRAS or E-numbered but have gone through proper testing and have been demonstrated as safe for human consumption in the amounts proposed for use in the film.

Shaping and Sealing

The disclosed sealing solution can be used to seal to water-soluble film surfaces with or without the application of heat and/or pressure thereto, for example according to conventional film processing techniques. Prior to sealing, the water-soluble film(s) can be shaped according to various processes known in the art, such as by using heat in a thermoforming process. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In some embodiments, the film is heated using an infrared light. The film may be heated to a temperature of about 50 to about 150° C., about 50 to about 120° C., about 60 to about 130° C., about 70 to about 120° C., or about 60 to about 90° C. Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film with a suitable composition can be accomplished by utilizing any suitable means. In some embodiments, the most preferred method will depend on the product form and required speed of filling. In some embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Methods according to the disclosure utilize the sealing solution in any of its various embodiments to form a seal between two film surfaces. Other forms of sealing, including heat sealing, can be used in addition to solution sealing. Typically, only the film area which is to form the seal (including some optional excess margin) is treated with heat or sealing solution. The heat or sealing solution can be applied by any method, typically on the closing film material, and typically only on the areas which are to form the seal. Solution sealing methods preferably include selectively applying the sealing solution onto the area between the molds (e.g., matching mold surfaces), or on the closing film material, for example by spraying or printing this onto these areas, and then applying pressure onto these areas, to form the seal. Sealing rolls and belts as described above (optionally also providing heat) can be used.

The formed water-soluble packets or pouches may then be cut by a cutting device. Cutting can be accomplished using any suitable method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area in addition to or in the alternative to slicing. The different compartments of multi-compartment pouches may be made together in a side-by-side style wherein the resulting, conjoined pouches may or may not be separated by cutting. Alternatively, the compartments can be made separately. It should be understood that by the use of appropriate feed stations, it may be possible to manufacture multi-compartment pouches incorporating a number of different or distinctive compositions and/or different or distinctive liquid, gel or paste compositions.

FIG. 1 illustrates a cross-sectional view of a sealed water-soluble packet 100 formed according to the disclosure using a sealing solution as described above in any of its embodiments. A first water-soluble film 10 includes a first surface 12. As shown, the first water-soluble film 10 has been shaped (e.g., thermoformed) such that a portion of the film 10 defines a volume (or compartment) 40 into which a suitable composition 50 can be placed prior to sealing the packet 100. In the illustrated embodiment, the first surface 12 generally corresponds to an upper or top (e.g., relative to gravity or filling direction of the compartment 40) circumferential surface of the first water-soluble film 10 around the compartment 40. The sealing solution can be applied to the first surface 12 by any suitable means (e.g., spraying, printing), for example before or after shaping of the first water-soluble film 10 and/or adding of the composition 50 to the compartment 40. A second water-soluble film 20 is thereafter contacted with the first water-soluble film 10 to enclose the compartment 40 (e.g., completely around the circumference of compartment 40, although embodiments wherein the compartment is thereby enclosed only partially are also contemplated). As illustrated, a second surface 22 of the second water-soluble film 20 (e.g., bottom or lower surface thereof) contacts the first surface 12 where the sealing solution is present at an interfacial region 30 between the two surfaces 12, 22. The two surfaces 12, 22 are held in contact (e.g., via pressure) for a time sufficient to form a seal 32 between the two films 10, 20 and surfaces 12, 22, thus creating the sealed water-soluble packet 100. The sealing time is selected to dissolve surface portions of the two films 10, 20 in the interfacial region 30, whereupon subsequent evaporation and/or diffusive mass transport of the water component of the sealing solution away from the interfacial region 30 permits the film 10, 20 components and sealing solution solvent to re-solidify into the seal 32.

In the embodiment illustrated in FIG. 1, the first surface 12 and the second surface 22 are from two separate water-soluble films 10, 20, respectively (e.g., separate pieces of film sealed together, which films can be formed from the same or different components). In another embodiment (not shown), the first surface 12 and the second surface 22 can be distinct regions from the same water-soluble film 10 (e.g., separate regions of same piece of film folded and sealed onto each other). Similarly, the embodiment of FIG. 1 is described with the sealing solution being applied to the first surface 12. In other embodiments, the sealing solution can be applied additionally or alternatively to the second surface 22 prior to contacting the two surfaces 12, 22 and forming the seal 32. In cases where the sealing solution is applied to multiple film surfaces, the sealing solution can be the same for all surfaces or different for different surfaces (e.g., sealing solutions and their corresponding solvent(s) can be selected depending on the particular film to which they are to be applied).

Figure 2:
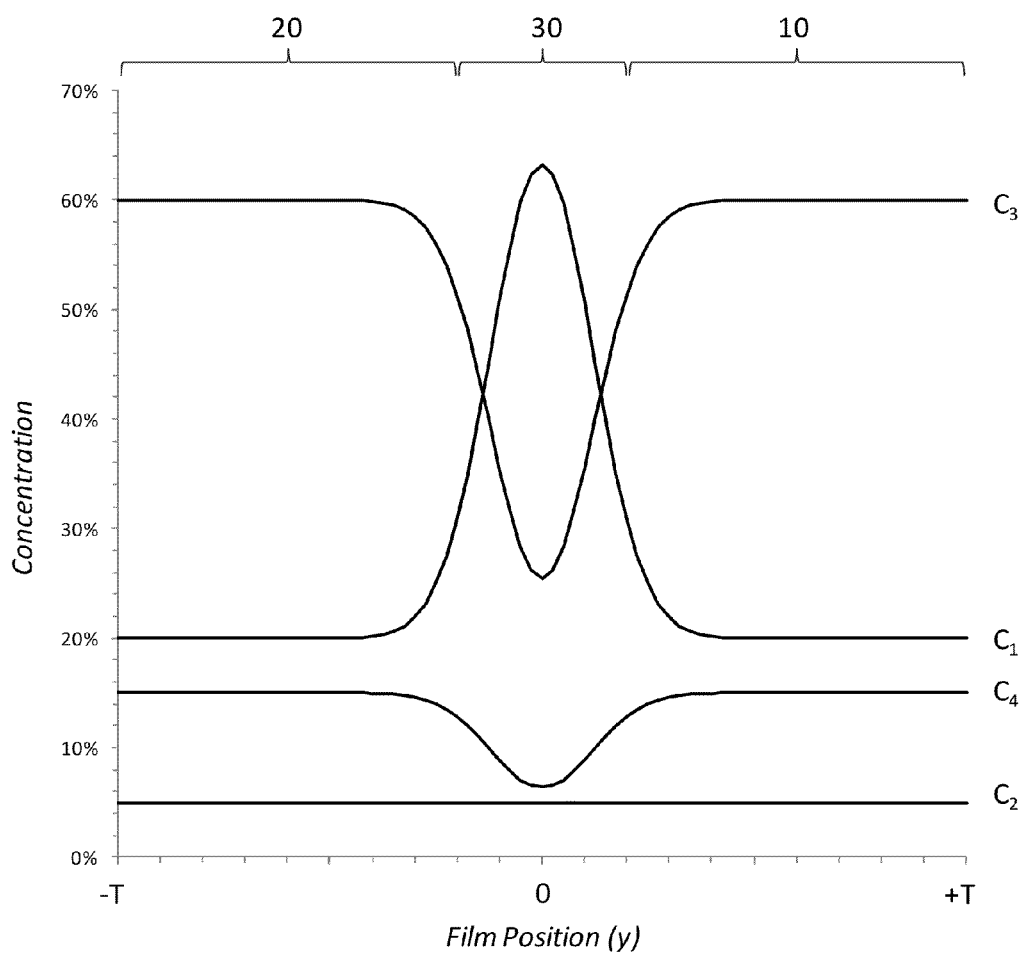
FIG. 2 is a qualitative concentration profile along line P of FIG. 1 illustrating local concentrations of sealing solution components and water-soluble film components in bulk and seal-interfacial regions of a sealed water-soluble film.
Figure 3:
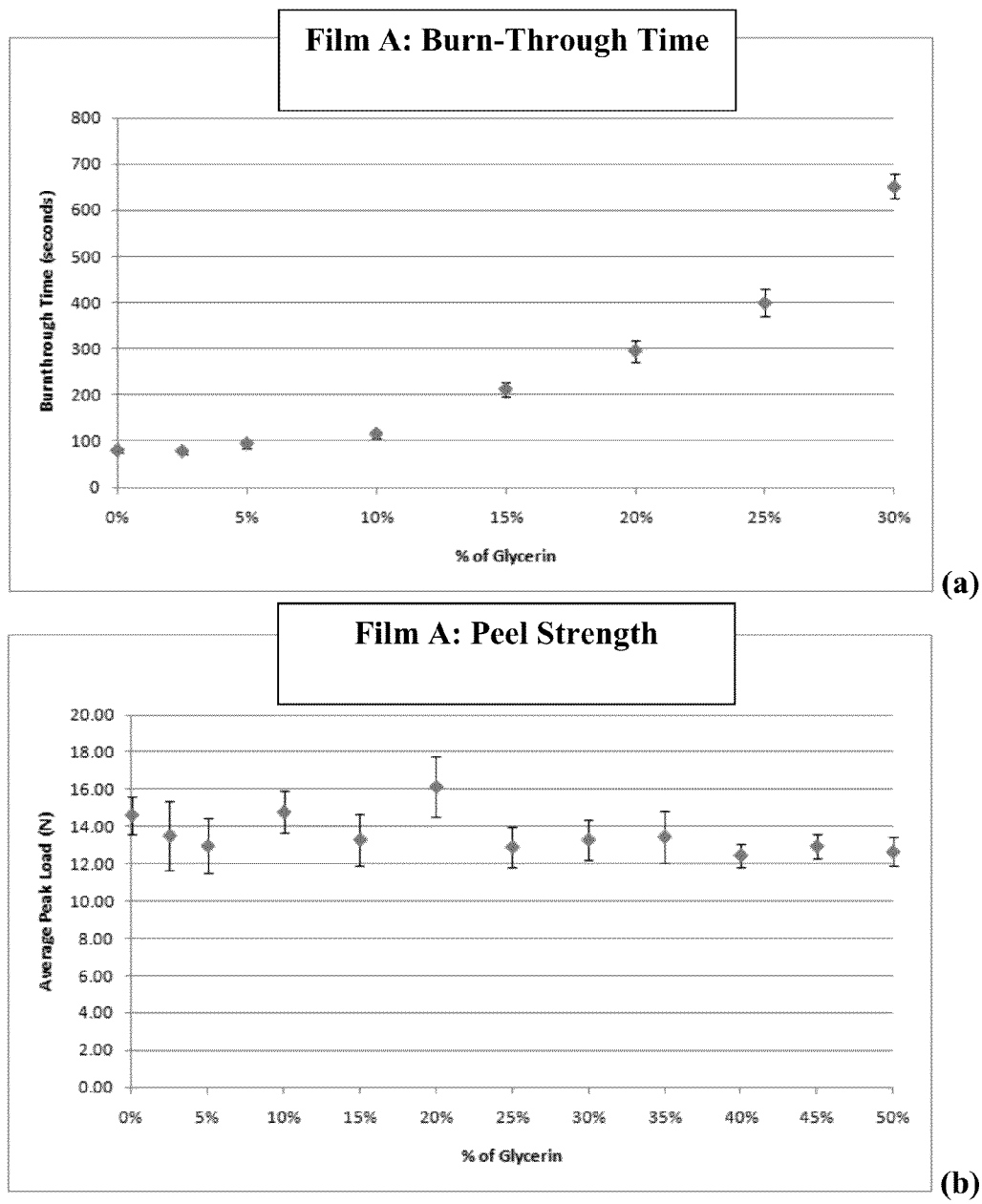
FIG. 3 includes graphs and tables illustrating (a) the burn-through time and (b) the seal peel strength for PVOH copolymer Film A as a function of glycerin concentration for glycerin-in-water sealing solutions according to the disclosure.
Figure 4:
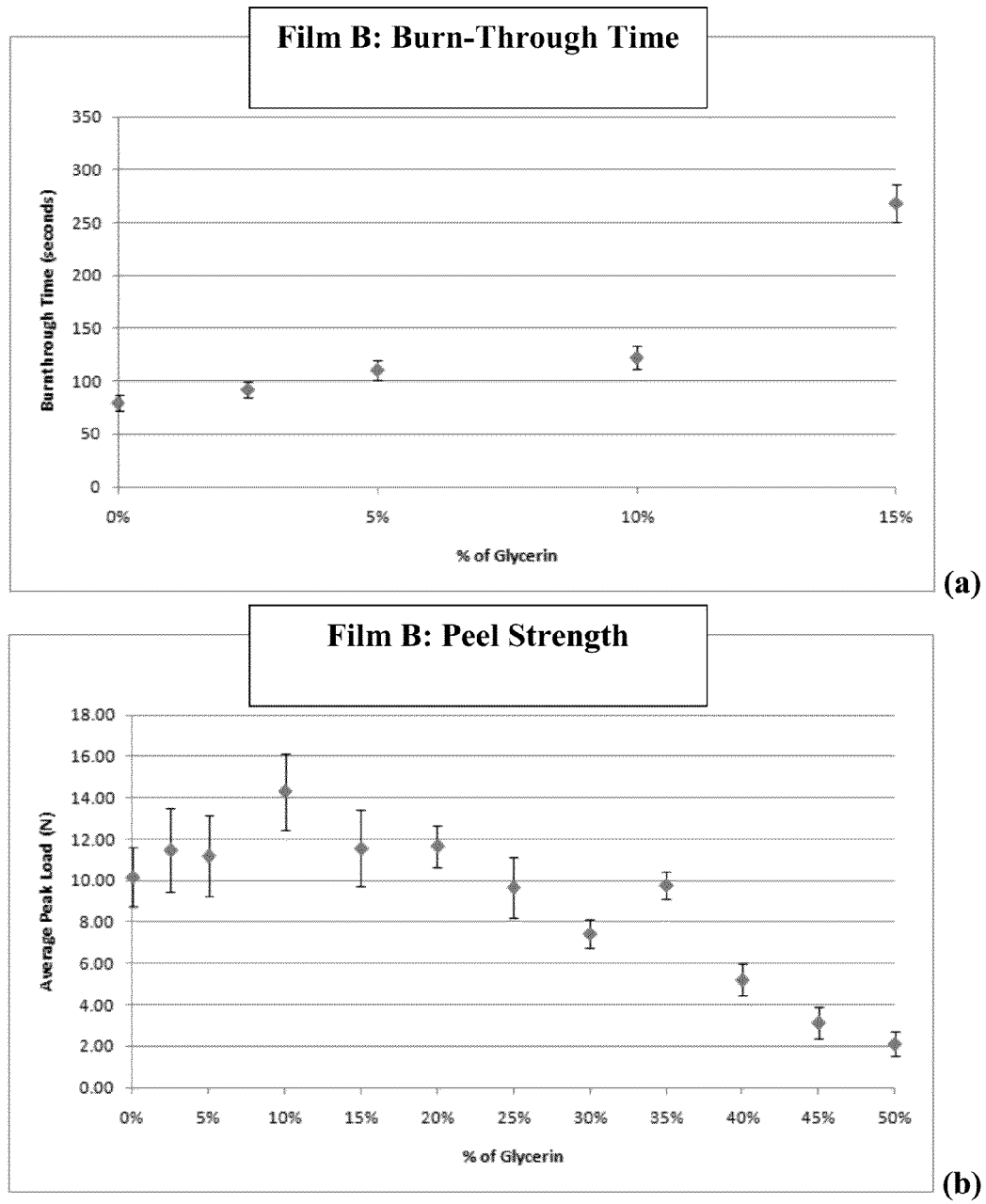
FIG. 4 includes graphs and tables illustrating (a) the burn-through time and (b) the seal peel strength for PVOH copolymer Film B as a function of glycerin concentration for glycerin-in-water sealing solutions according to the disclosure.
Figure 5:
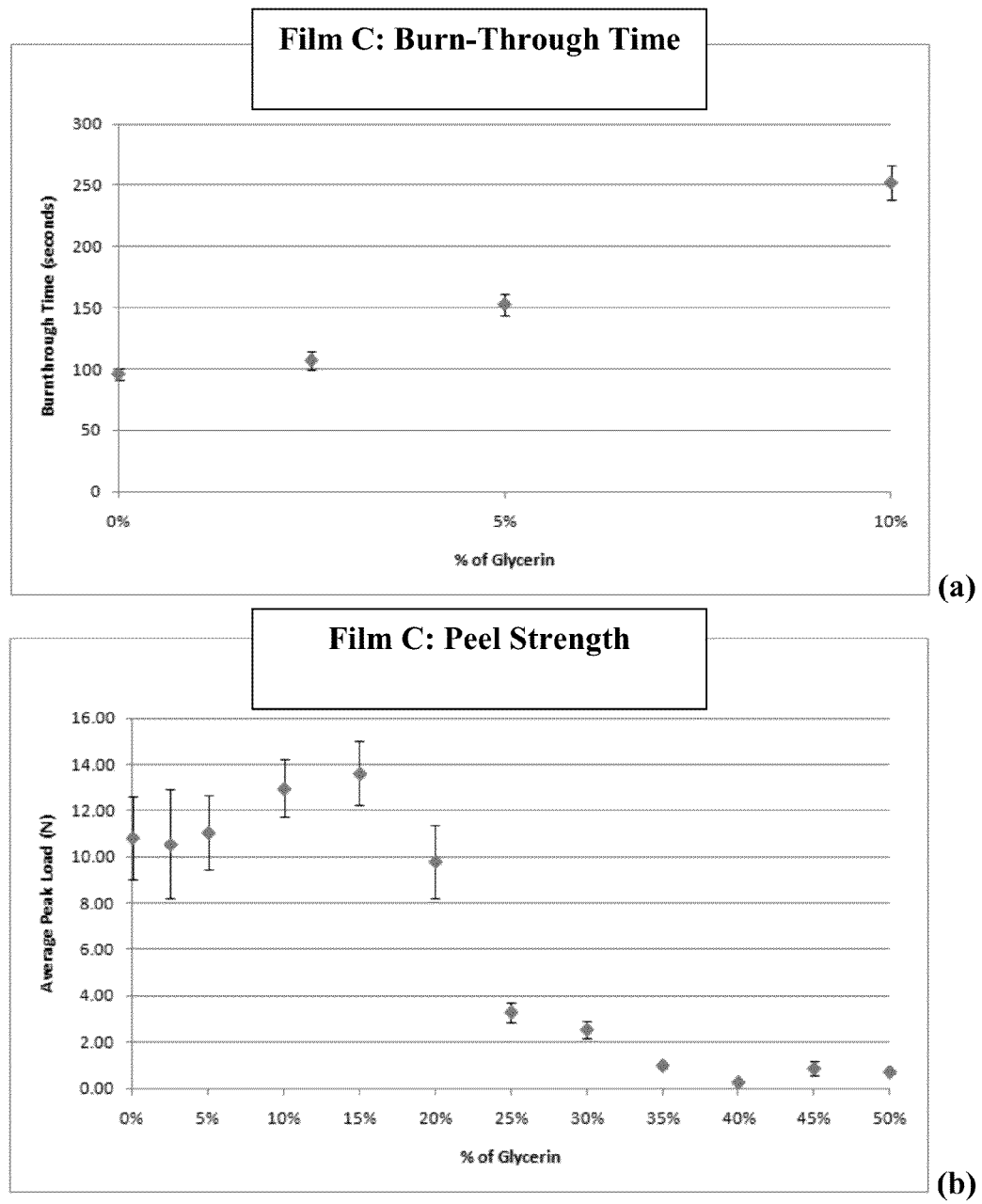
FIG. 5 includes graphs and tables illustrating (a) the burn-through time and (b) the seal peel strength for PVOH copolymer Film C as a function of glycerin concentration for glycerin-in-water sealing solutions according to the disclosure.
Figure 6:
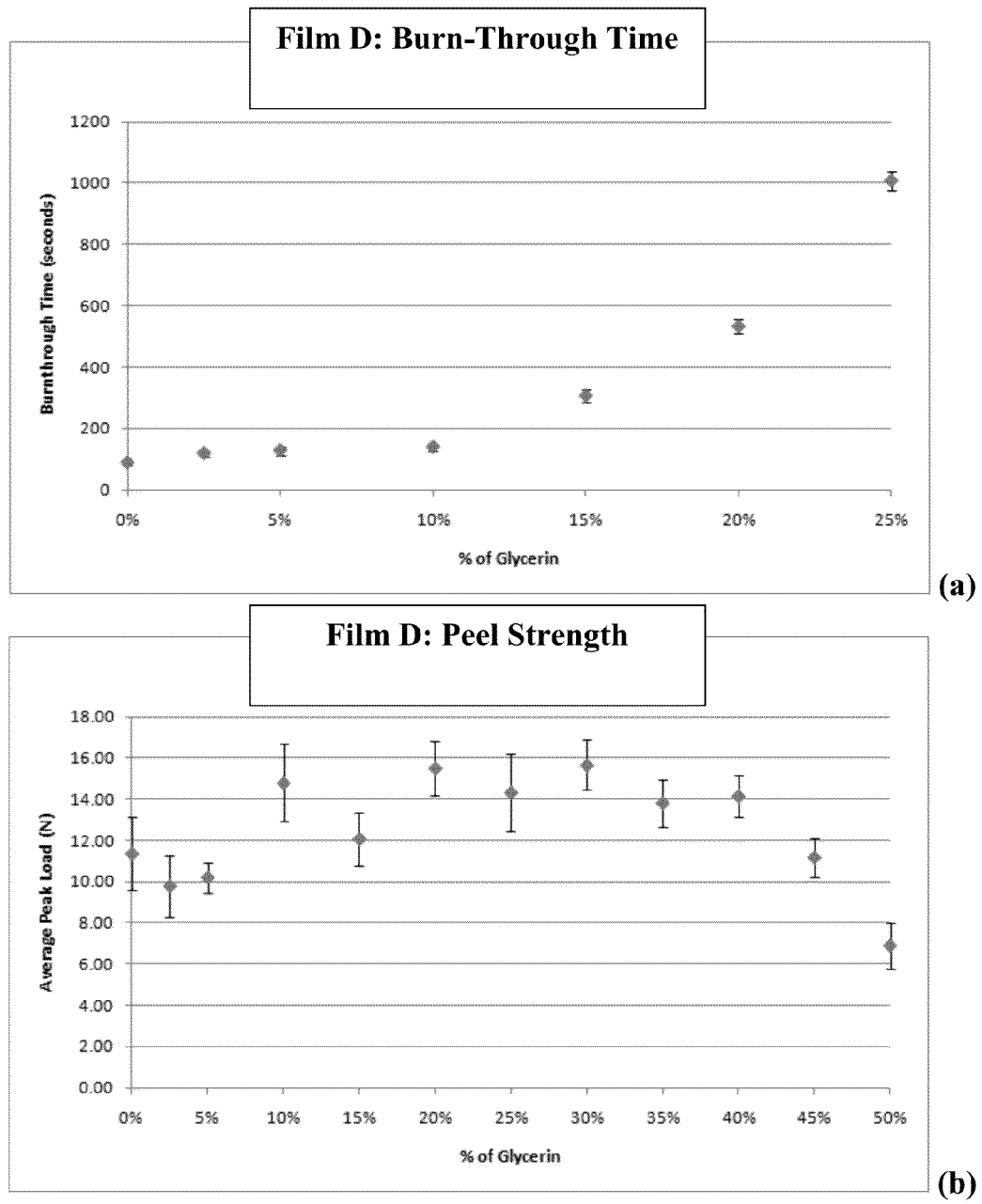
FIG. 6 includes graphs and tables illustrating (a) the burn-through time and (b) the seal peel strength for PVOH homopolymer Film D as a function of glycerin concentration for glycerin-in-water sealing solutions according to the disclosure.
Figure 7:
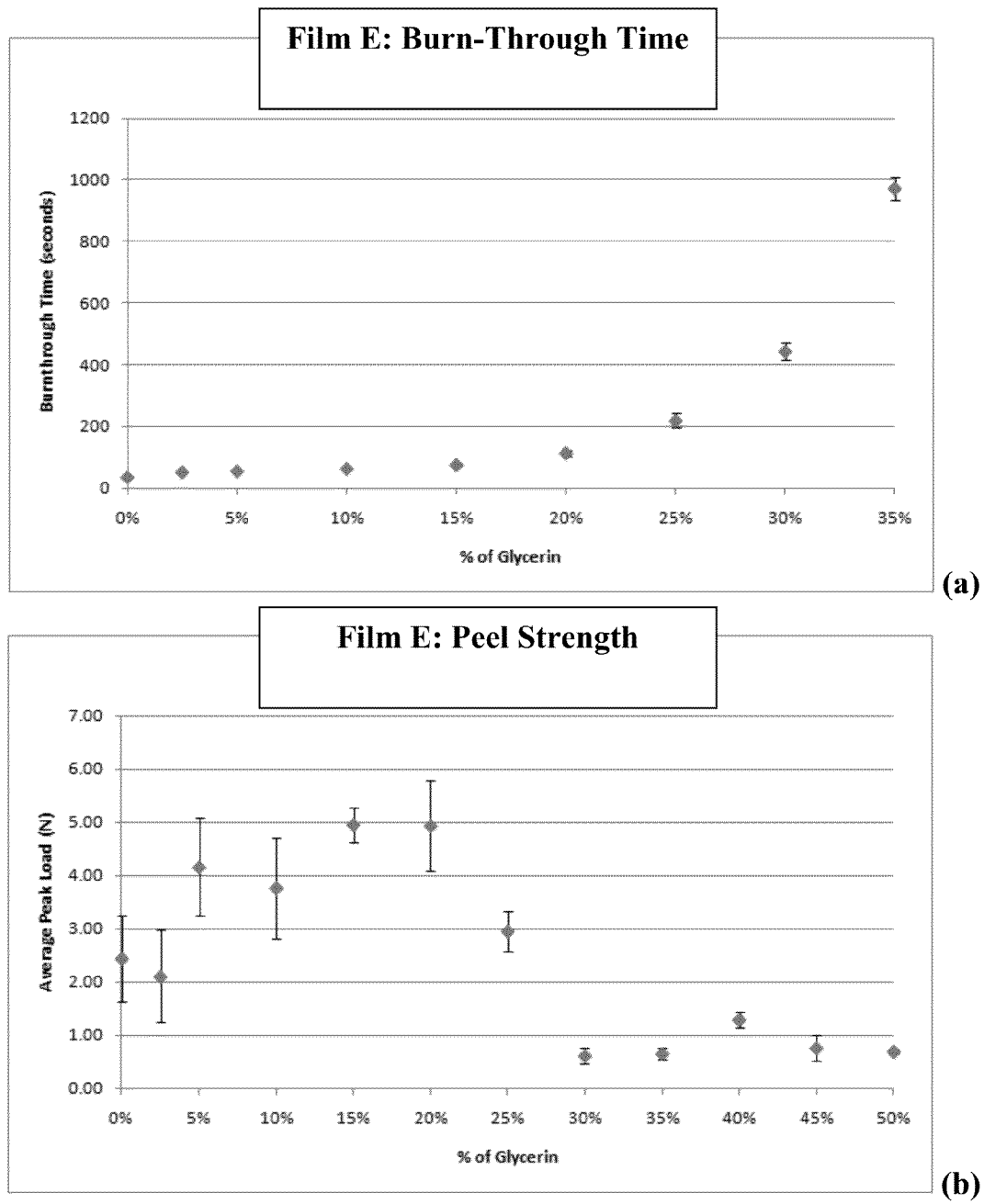
FIG. 7 includes graphs and tables illustrating (a) the burn-through time and (b) the seal peel strength for PVOH homopolymer Film E as a function of glycerin concentration for glycerin-in-water sealing solutions according to the disclosure.
Figure 8:
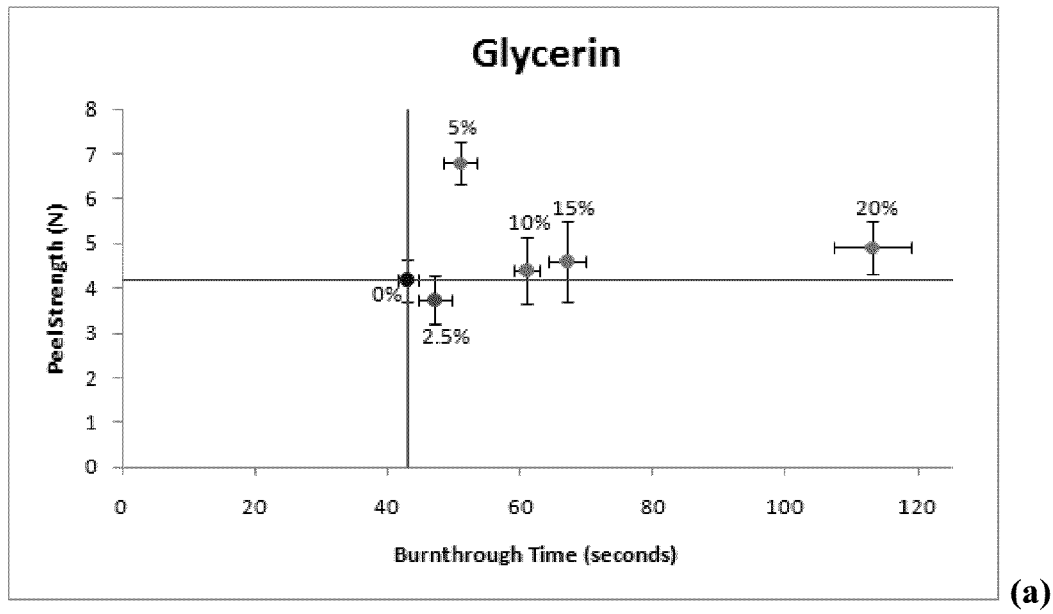
FIG. 8 includes graphs illustrating the burn-through time and the seal peel strength for PVOH homopolymer Film F for glycerin-in-water sealing solutions according to the disclosure (a) at low concentrations and (b) and high concentrations.
Figure 8:
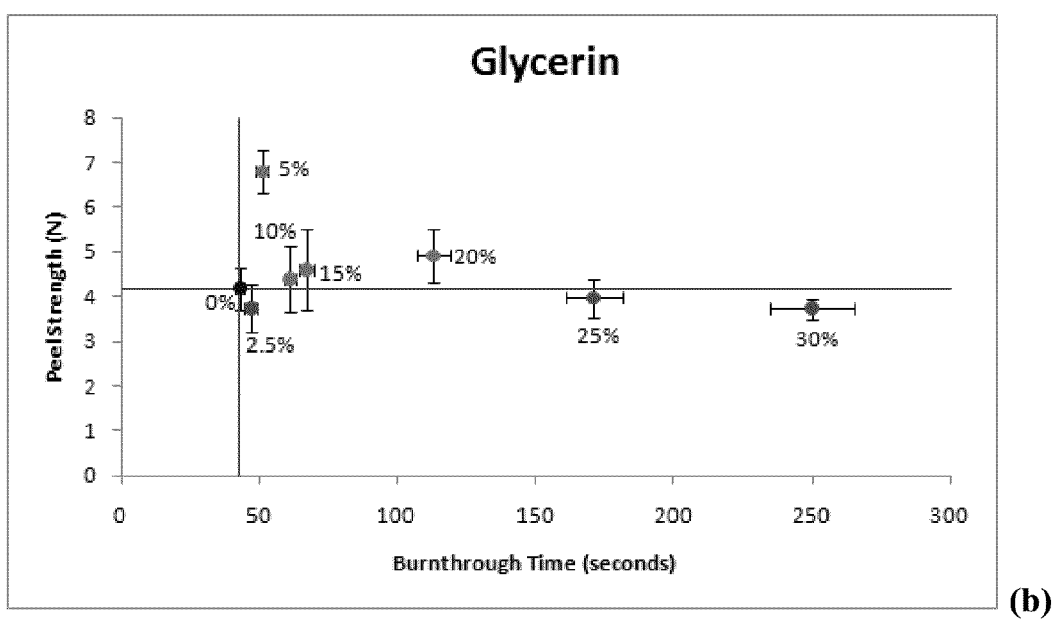
Figure 9:
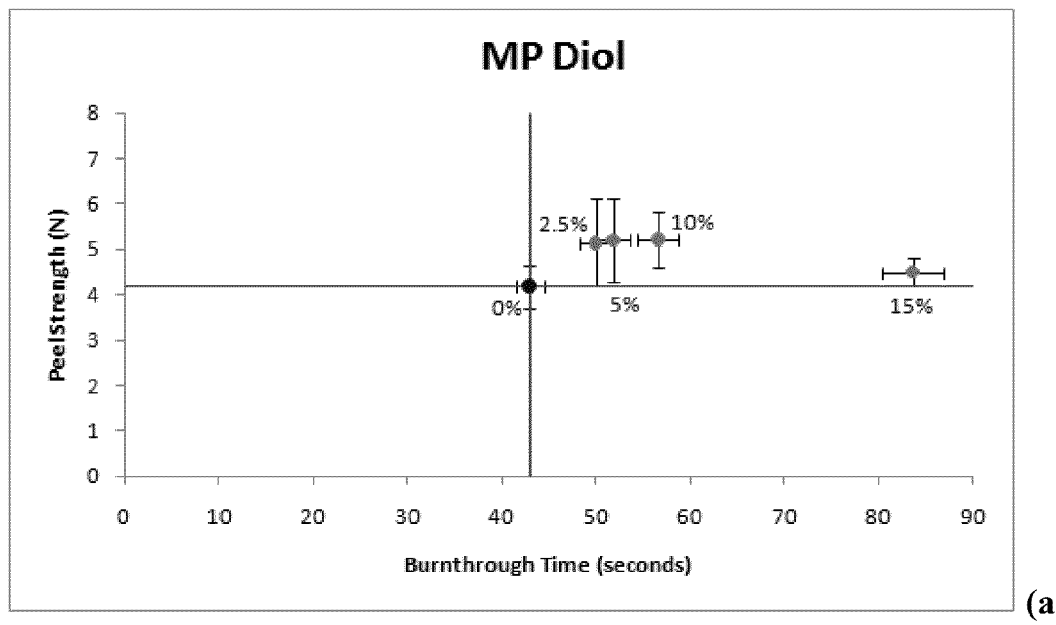
FIG. 9 includes graphs illustrating the burn-through time and the seal peel strength for PVOH homopolymer Film F for 2-methyl-1,3-propanediol (MP diol)-in-water sealing solutions according to the disclosure (a) at low concentrations and (b) and high concentrations.
Figure 9:
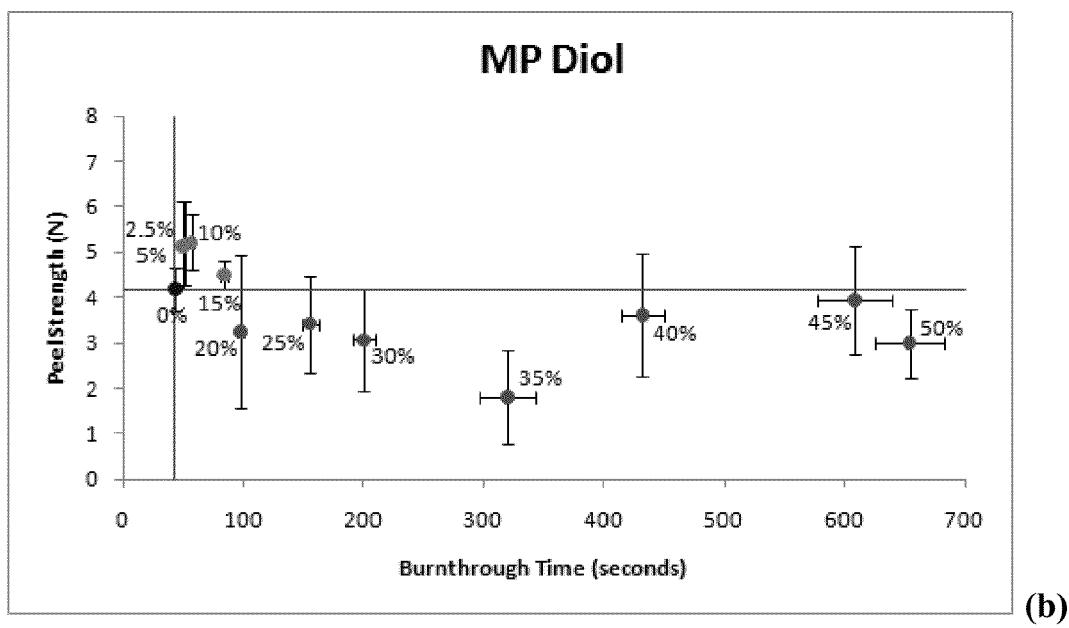
Figure 10:
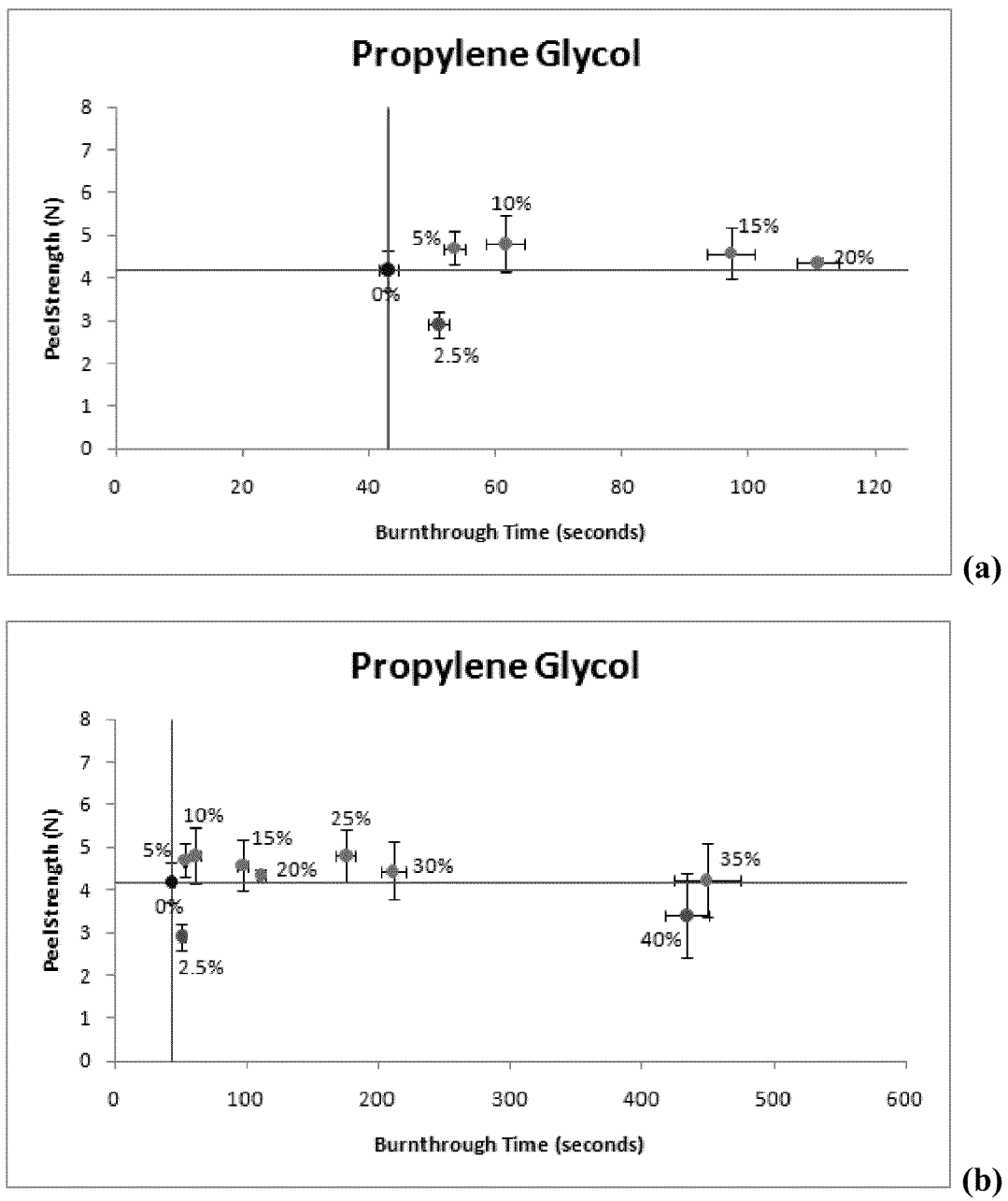
FIG. 10 includes graphs illustrating the burn-through time and the seal peel strength for PVOH homopolymer Film F for propylene glycol-in-water sealing solutions according to the disclosure (a) at low concentrations and (b) and high concentrations.
Figure 11:
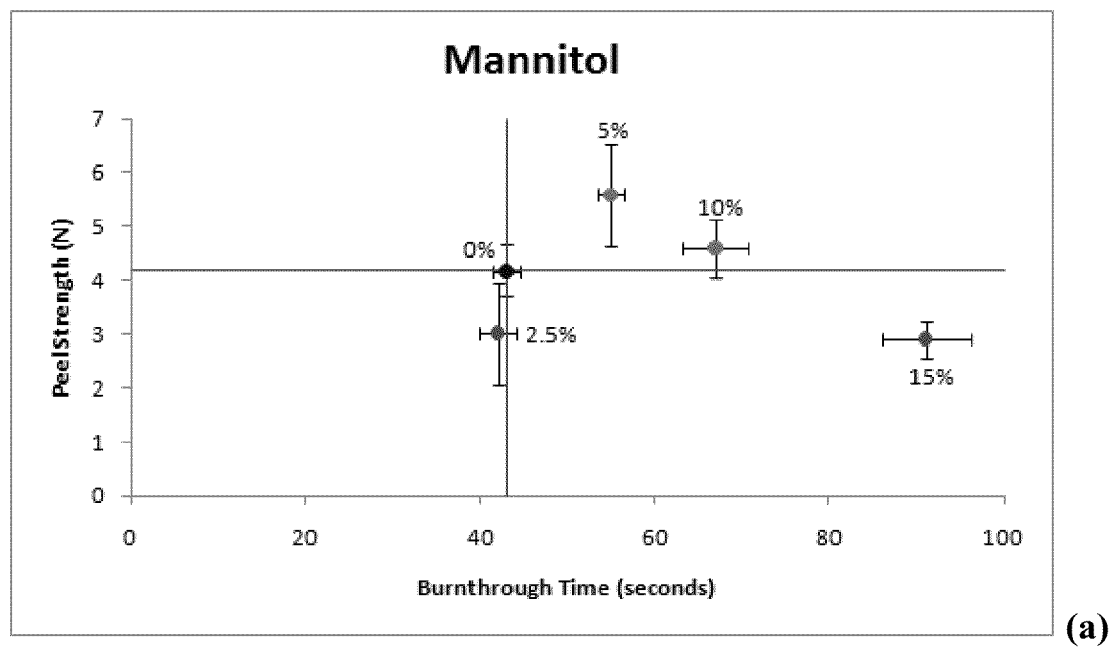
FIG. 11 includes a graph illustrating the burn-through time and the seal peel strength for PVOH homopolymer Film F for mannitol-in-water sealing solutions according to the disclosure (a) at low concentrations.
Figure 12:
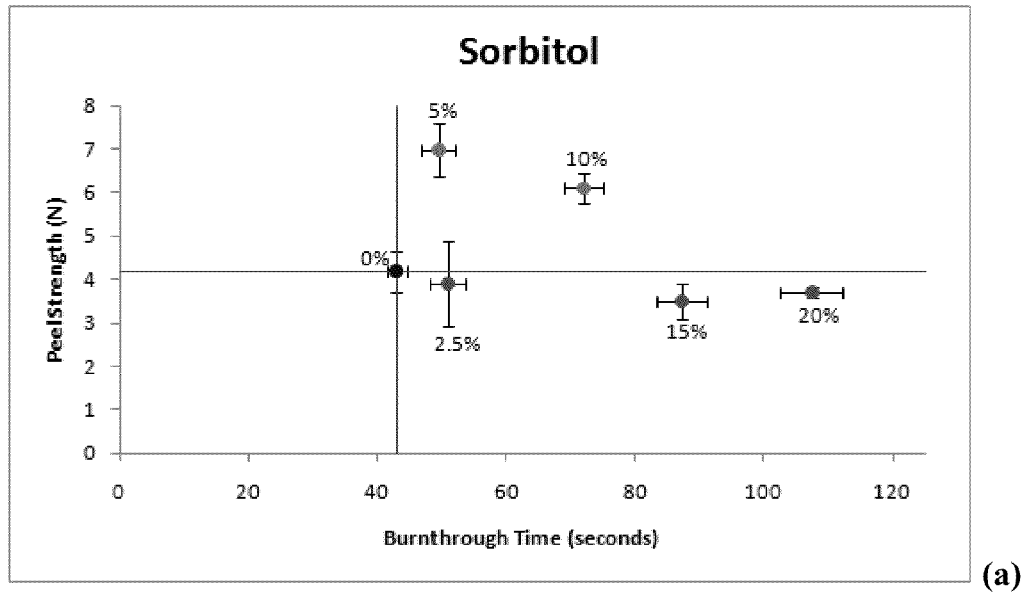
FIG. 12 includes graphs illustrating the burn-through time and the seal peel strength for PVOH homopolymer Film F for sorbitol-in-water sealing solutions according to the disclosure (a) at low concentrations and (b) and high concentrations.
Figure 12:
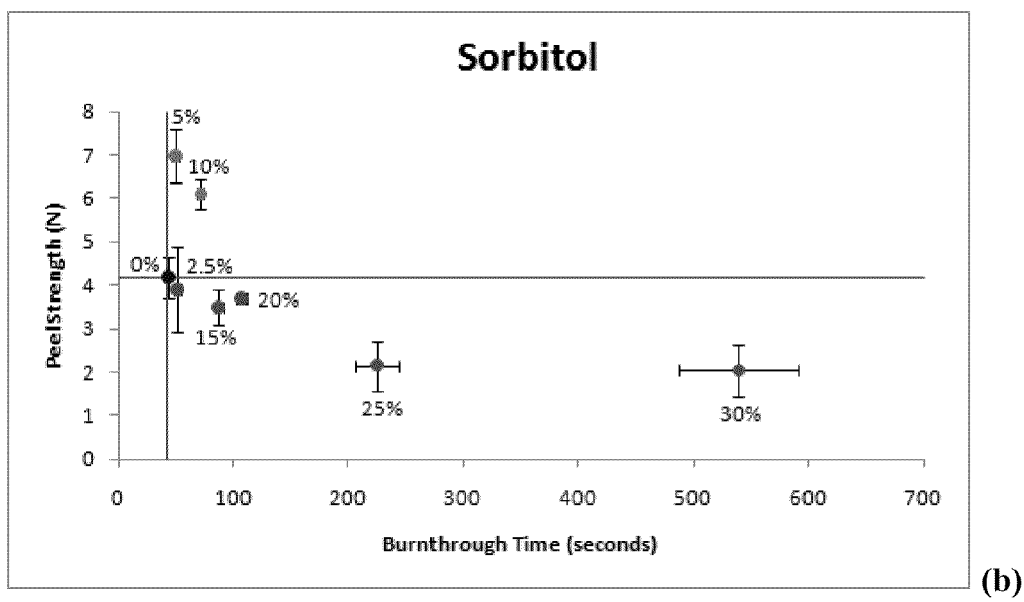
Figure 13:
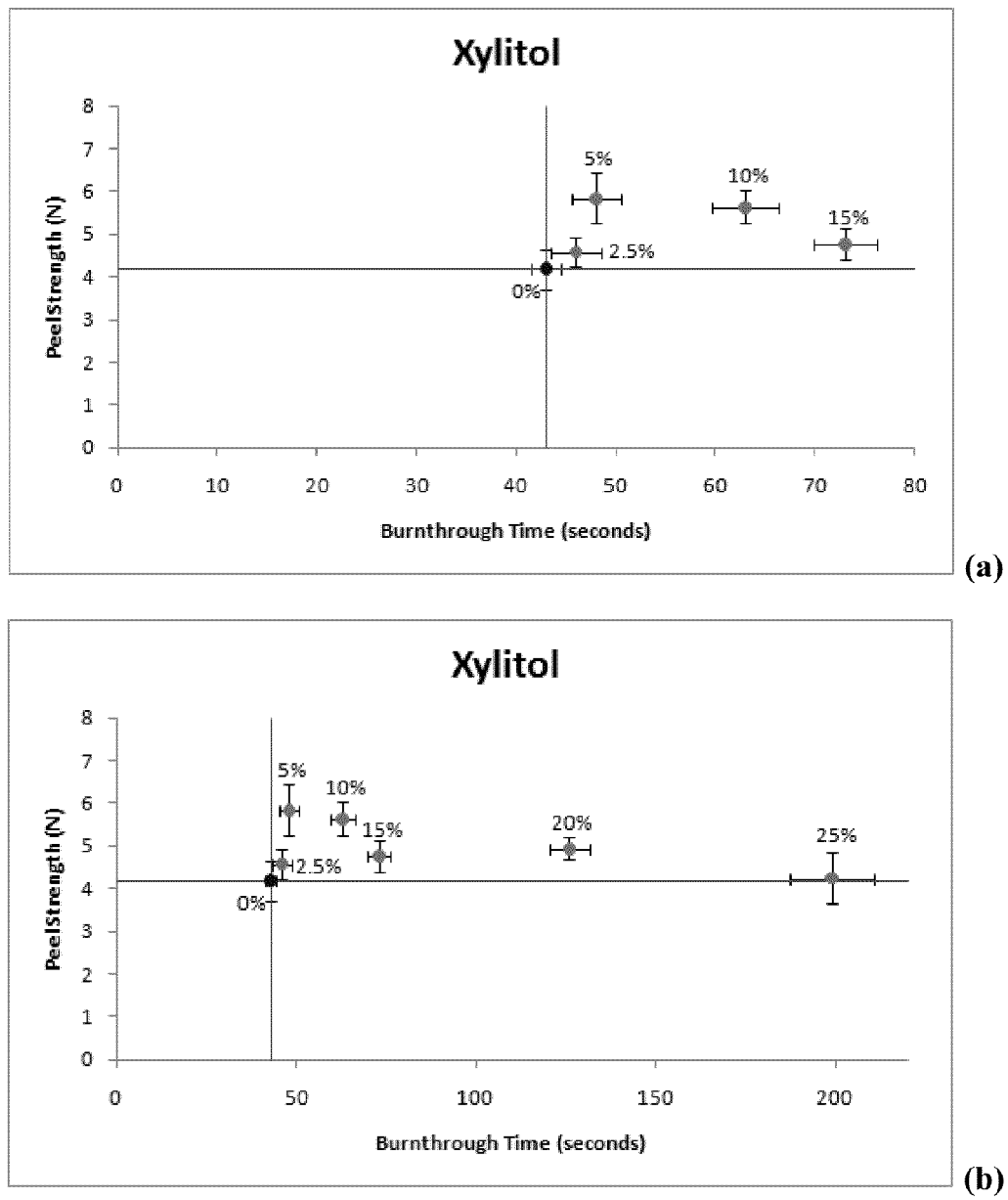
FIG. 13 includes graphs illustrating the burn-through time and the seal peel strength for PVOH homopolymer Film F for xylitol-in-water sealing solutions according to the disclosure (a) at low concentrations and (b) and high concentrations.

FIG. 2 illustrates qualitative spatial profiles for local concentrations of representative film and sealing solution components ($C_1$-$C_4$) in the bulk film regions 10, 20 and in the interfacial region 30 of the water-soluble packet 100 and the seal 32. The profiles are illustrated along line P of FIG. 1 for water-soluble films 10, 20 with a nominal thickness T, but more generally apply along a reference line generally normal to the first and second surfaces 12, 22 and passing through the interfacial region 30. As described below, the sealing solution solvent (e.g., polyol or otherwise) is generally present in the interfacial region 30 at a local concentration substantially higher than a bulk concentration of the polyol in the water-soluble film and outside of the interfacial region 30. For example, a local solvent concentration of at least 40, 50, 60, 70, 80, or 90 wt. % and/or up to 60, 70, 80, 90, or 100 wt. % may be observed in the interfacial region 30 (e.g., as an average concentration in the interfacial region 30 or as a peak value in the concentration profile passing through the interfacial region). Complementarily to the sealing solution solvent, one or more components of the water-soluble film may be present in the interfacial region 30 at a local concentration substantially lower than the bulk concentration of the particular component in the water-soluble film and outside of the interfacial region (e.g., bulk film components (other than the sealing solution solvent) such as polymer, plasticizer, etc. may diffuse into the interfacial region 30 but be present at correspondingly lower concentrations due to dilution with the more concentrated sealing solution solvent).

By way of non-limiting example, the representative concentration profiles in FIG. 2 can illustrate the article 100 and seal 32 resulting from the use of a dilute glycerin-in-water sealing solution (e.g., 5 wt. % to 10 wt. % glycerin) to seal a PVOH film plasticized with glycerin and propylene glycol (e.g., in a film containing 60 wt. % PVOH, 20 wt. % glycerin, 15 wt. % propylene glycol as added components and 5 wt. % water as an illustrative equilibrium environmental moisture content). In FIG. 2, the illustrated components are glycerin ($C_1$, as a sealing solution solvent and film plasticizer), water ($C_2$, as environmental moisture), PVOH ($C_3$, as a film water-soluble polymer), and propylene glycol ($C_4$, as a film plasticizer). Although relatively dilute for solvent glycerin, evaporation and diffusive mass transport of water added from the sealing solution away from the interfacial region 30 during the sealing process may yield a region where the solvent glycerin is locally highly concentrated in the seal 32. Because the sealing solution acts to dissolve boundary regions of the first and second water-soluble films 10, 20, the PVOH resin and propylene glycol plasticizer components thereof may be transported into the interfacial region 30, albeit at lower concentrations than in the bulk film 10, 20, owing to the diluting effect of the sealing solution solvent in the interfacial region 30.

As described above, the sealing solution is particularly effective at providing one or more benefits, including: a reduction in dissolution time for the water-soluble films 10, 20 by the sealing solution and an increase in the strength of the resulting seal 32 formed with the sealing solution, both relative to the use of water alone as a reference sealant. The benefits may be realized for a variety of film thicknesses, including those having an initial thickness ranging from about 10 μm to about 150 μm or about 30 μm to about 60 μm (e.g., an initial thickness of at least 10, 20, 30, 35, or 40 μm and/or up to 40, 50, 60, 70, 80, 100, or 150 μm, where the initial thickness refers to nominal film thickness prior to potential (local) stretching or thinning of film during a forming or sealing process).

The sealing solution is particularly useful for water-soluble films of a given thickness having a relatively short burn-through time (as defined below) for water, insofar as such short times can result in substantial film destruction when using water alone as a sealant. In some embodiments, water-soluble films 10, 20 are selected which have burn-through times of about 45 sec or about 50 sec or less using water alone as a test solvent. With a sealing solution according to the disclosure, however, the film burn-through times are increased relative to the water reference, and are generally about 45 sec or about 50 sec or more. More generally, in other embodiments, the water-only burn-through times can be at least about 10, 20, or 30 sec and/or up to about 20, 30, 40, 45, 50, or 60 sec, and sealing solution burn-through times can be at least about 45, 50, 60, 80, or 100 sec and/or up to about 60, 80, 100, 150, 200, or 500 sec, also with an increase relative to the corresponding water-only times.

The seal 32 resulting from the sealing solution can be characterized as having an increased peel strength or load (as defined below) for water-soluble films of a given thickness, for example relative to a seal formed with water alone. In various embodiments, the seal 32 exhibits a peel strength of at least about 30% greater than that of a corresponding seal formed with water alone (e.g., at least about 30%, 40%, 50%, or 60% and/or up to about 50%, 60%, 80%, 100%, 150%, or 200% increase relative to a water-only seal). Alternatively or additionally, the strength of the seal can be characterized as a minimum relative peel strength, or peel strength ratio, defined as the ratio of the absolute peel strength or load (e.g., measured in N for films of a given thickness) to the film peak load (e.g., also measured in N for films of the same thickness as a tensile strength measurement described below). For example, the seal 32 can have a peel strength ratio (expressed as a percent) of at least 12%, 15%, 20%, or 30% and/or up to 40%, 60%, 80%, or 100%.

The water-soluble packets may contain various compositions. A multi-compartment pouch may contain the same or different compositions in each separate compartment. This feature of the disclosure may be utilized to keep compositions containing incompatible ingredients (e.g., bleach and enzymes) physically separated or partitioned from each other. Such partitioning may provide aesthetic benefits, expand the useful life and/or decrease physical instability of the pouch contents.

Non-limiting examples of useful compositions include human and animal ingestible items, personal care compositions and cleaning compositions. Representative human and animal ingestible items include dehydrated or instant beverages (coffee, tea, juice), dried foods (e.g., starch-based foods such as pasta, rice, oatmeal, etc.), pet foods and nutritional or exercise supplements (e.g., protein supplements, vitamin supplements). Representative personal compositions include lotions (for example moisturizing and/or sun screen), protective emollients and similar compositions, Suitable cleaning compositions include light duty and heavy duty liquid detergent compositions, hard surface cleaning compositions, detergent gels commonly used for laundry, and bleach and laundry additives, shampoos, body washes, and similar compositions. Compositions of use in the present pouches may take the form of a liquid, gel, paste, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

Specific contemplated aspects of the disclosure are herein described in the following numbered paragraphs.

1. A method for sealing a water-soluble film, the method comprising: (a) applying a sealing solution to a first surface of a water-soluble film, the sealing solution comprising (i) water, and (ii) a polyol having 3 or more hydroxyl groups, wherein the sealing solution has a dynamic viscosity ($\mu_s$) less than 1.5 cP as measured at 20° C.; and (b) contacting a second surface of a water-soluble film with the sealing solution on the first surface for a time sufficient to form a seal between the first surface and the second surface.

2. The method of paragraph 1, wherein the polyol is present in the sealing solution in an amount ranging from about 2 wt. % to about 15 wt. %.

3. The method of any of the preceding paragraphs, wherein the sealing solution consists essentially of water and one or more polyols each having 3 or more hydroxyl groups 4. The method of any of the preceding paragraphs, wherein the polyol contains 2 to 12 carbon atoms and 3 to 12 hydroxyl groups 5. The method of any of the preceding paragraphs, wherein the polyol is selected from the group consisting of glycerol, erythritol, threitol, arabitol, xylitol, ribitol, mannitol, sorbitol, galactitol, fucitol, iditol, inositol, volemitol, isomalt, maltitol, lactitol, and combinations thereof 6. A method for sealing a water-soluble film, the method comprising: (a) applying a sealing solution to a first surface of a water-soluble film having an initial thickness less than about 50 μm and comprising a polyvinyl alcohol copolymer consisting essentially of vinyl alcohol monomeric repeat units and vinyl acetate monomeric repeat units, the sealing solution comprising (i) water, and (ii) a polyol present in the sealing solution in an amount ranging from about 2 wt. % to about 15 wt. %, the polyol being selected from the group consisting of glycerol, erythritol, threitol, arabitol, xylitol, ribitol, mannitol, sorbitol, galactitol, fucitol, iditol, inositol, volemitol, isomalt, maltitol, lactitol, and combinations thereof, wherein the sealing solution has a dynamic viscosity ($\mu_s$) less than 1.5 cP as measured at 20° C.; and (b) contacting a second surface of a water-soluble film having an initial thickness less than about 50 μm and comprising a polyvinyl alcohol copolymer consisting essentially of vinyl alcohol monomeric repeat units and vinyl acetate monomeric repeat units with the sealing solution on the first surface for a time sufficient to form a seal between the first surface and the second surface.

7. The method of paragraph 6, wherein the water-soluble film for each of the first surface and the second surface: (i) has a degree of hydrolysis ranging from about 86.5% to about 89%; and (ii) further comprises: (A) a sugar alcohol plasticizer selected from the group consisting of isomalt, maltitol, sorbitol, xylitol, erythritol, adonitol, dulcitol, pentaerythritol, mannitol, and combinations thereof, (B) a liquid plasticizer selected from the group consisting of glycerin, diglycerin, ethylene glycol, diethylene glycol, triethylene glycol, tetraethylene glycol, propylene glycol, polyethylene glycols up to 400 MW, 2-methyl-1,3-propanediol, and combinations thereof, and (C) a compatibilizing agent selected from the group consisting of cellulose ethers, polysaccharides of pectin, polysaccharides of sodium alginate, modified starches, and combinations thereof 8. A method for sealing a water-soluble film, the method comprising: (a) applying a sealing solution to a first surface of a water-soluble film, the sealing solution comprising (i) water, and (ii) a solvent for at least one polymeric component of the water-soluble film, wherein (A) the solvent and the polymeric component have a solubility radius (Ra) of about 5 or less as defined by equation (I):

$$(Ra)^2 = 4(\delta_{D,S} - \delta_{D,P})^2 + (\delta_{P,S} - \delta_{P,P})^2 + (\delta_{H,S} - \delta_{H,P})^2 \quad (I)$$

where $\delta_{D,S}$ is the solvent dispersive force, $\delta_{D,P}$ is the polymeric component dispersive force, $\delta_{P,S}$ is the solvent polar force, $\delta_{P,P}$ is the polymeric component polar force, $\delta_{H,S}$ is the solvent hydrogen bonding force, and $\delta_{H,P}$ is the polymeric component hydrogen bonding force, each of which is determined by a consistent method of Hansen solubility parameter evaluation, and (B) the sealing solution has a dynamic viscosity ($\mu_s$) less than 1.5 cP as measured at 20° C.; and (b) contacting a second surface of a water-soluble film with the sealing solution on the first surface for a time sufficient to form a seal between the first surface and the second surface.

9. The method of paragraph 8, wherein the solubility radius ranges from about 1 to about 5.

10. The method of any one of paragraphs 8 to 9, wherein (i) the polymeric component comprises polyvinyl alcohol; (ii) $\delta_{P,S}$ is at least about 10; and (iii) $\delta_{H,S}$ is at least about 22.

11. The method of any one of paragraphs 8 to 10, wherein the solvent is present in the sealing solution in an amount ranging from about 2 wt. % to about 15 wt. %.

12. The method of any one of paragraphs 8 to 11, wherein the sealing solution consists essentially of water and one or more solvents each having a solubility radius of about 5 or less relative to the polymeric component.

13. The method of any of the preceding paragraphs, wherein the dynamic viscosity ranges from about 1 cP to about 1.45 cP.

14. The method of any of the preceding paragraphs, wherein: (i) the water-soluble film has a burn-through time of about 45 sec or less using water alone as a test solvent; and (ii) the water-soluble film has a burn-through time (A) of about 45 sec or more using the sealing solution as a test solvent and (B) greater than the burn-through time using water alone as a test solvent.

15. The method of any of the preceding paragraphs, wherein the seal exhibits a peel strength of at least about 12% relative to the peak load of the water-soluble film.

16. The method of any of the preceding paragraphs, wherein the seal exhibits a peel strength of at least about 30% greater than that of a corresponding seal formed with water alone.

17. The method of any of the preceding paragraphs, wherein the first surface and the second surface each independently have an initial thickness ranging from about 10 μm to about 150 μm.

18. The method of any of the preceding paragraphs, wherein the water-soluble film comprises a water-soluble polymer selected from the group consisting of polyvinyl alcohols, polyethyleneimines, polyacrylates, water-soluble acrylate copolymers, polyvinyl pyrrolidones, pullulans, guar gums, xanthan gums, carrageenans, starches, ethoxylated starches, hydroxypropylated starches, polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, copolymers thereof, blends thereof, and combinations thereof 19. The method of paragraph 18, wherein the water-soluble polymer has a 4% solution viscosity ranging from about 3 cP to about 27 cP at 20° C.

20. The method of any of the preceding paragraphs, wherein the water-soluble film comprises a water-soluble polymer comprising polyvinyl alcohol.

21. The method of paragraph 20, wherein the water-soluble polymer comprises a polyvinyl alcohol copolymer consisting essentially of vinyl alcohol monomeric repeat units and vinyl acetate monomeric repeat units.

22. The method of any one of paragraphs 20 to 21, wherein the polyvinyl alcohol has a degree of hydrolysis ranging from about 75% to about 99%.

23. The method of any one of paragraphs 20 to 21, wherein the polyvinyl alcohol has a degree of hydrolysis ranging from about 86.5% to about 89%.

24. The method of any of the preceding paragraphs, wherein the first surface and the second surface are from the same water-soluble film.

25. The method of any of the preceding paragraphs, wherein the first surface and the second surface are from different water-soluble films.

26. The method of any of the preceding paragraphs, wherein contacting the second surface with the first surface comprises at least one of applying pressure to the first surface and the second surface and applying heat to the first surface and the second surface to form the seal.

27. The method of any of the preceding paragraphs, wherein the second surface comprises a second sealing solution thereon to be contacted with the first surface when forming the seal.

28. The method of any of the preceding paragraphs, wherein: (i) the water-soluble film of at least one of the first surface and the second surface defines a volume at least partially enclosing a composition, and (ii) forming the seal creates a sealed water-soluble packet containing the composition.

29. The method of paragraph 28, wherein the composition is selected from the group consisting of human and animal ingestible items, personal care compositions and cleaning compositions.

30. An article comprising a sealed water-soluble film formed according to any of the preceding paragraphs.

31. An article comprising: (a) a first surface of a water-soluble film sealed to a second surface of a water-soluble film at an interfacial region between the first surface and the second surface; and (b) a polyol having 3 or more hydroxyl groups present in the interfacial region at a local concentration substantially higher than a bulk concentration of the polyol in the water-soluble film and outside of the interfacial region.

32. An article comprising: (a) a first surface of a water-soluble film sealed to a second surface of a water-soluble film at an interfacial region between the first surface and the second surface, wherein the water-soluble film for each of the first surface and the second surface has an initial thickness less than about 50 μm and comprises a polyvinyl alcohol copolymer consisting essentially of vinyl alcohol monomeric repeat units and vinyl acetate monomeric repeat units; and (b) a polyol present in the interfacial region at a local concentration substantially higher than a bulk concentration of the polyol in the water-soluble film and outside of the interfacial region, the polyol being selected from the group consisting of glycerol, erythritol, threitol, arabitol, xylitol, ribitol, mannitol, sorbitol, galactitol, fucitol, iditol, inositol, volemitol, isomalt, maltitol, lactitol, and combinations thereof 33. An article comprising: (a) a first surface of a water-soluble film sealed to a second surface of a water-soluble film at an interfacial region between the first surface and the second surface; and (b) a solvent for at least one polymeric component of the water-soluble film present in the interfacial region at a local concentration substantially higher than a bulk concentration of the solvent in the water-soluble film and outside of the interfacial region, wherein the solvent and the polymeric component have a solubility radius (Ra) of about 5 or less as defined by equation (I):

$$(Ra)^2 = 4(\delta_{D,S} - \delta_{D,P})^2 + (\delta_{P,S} - \delta_{P,P})^2 + (\delta_{H,S} - \delta_{H,P})^2 \quad (I)$$

where $\delta_{D,S}$ is the solvent dispersive force, $\delta_{D,P}$ is the polymeric component dispersive force, $\delta_{P,S}$ is the solvent polar force, $\delta_{P,P}$ is the polymeric component polar force, $\delta_{H,S}$ is the solvent hydrogen bonding force, and $\delta_{H,P}$ is the polymeric component hydrogen bonding force, each of which is determined by a consistent method of Hansen solubility parameter evaluation.

34. The article of any one of paragraphs 31 to 33, wherein one or more components of the water-soluble film are present in the interfacial region at a local concentration substantially lower than a bulk concentration of the one or more components in the water-soluble film and outside of the interfacial region.

35. A method for sealing a water-soluble film, the method comprising: (a) applying a sealing solution to a first surface of a water-soluble film having an initial thickness less than about 50 μm or about 40 μm and comprising a polyvinyl alcohol copolymer consisting essentially of vinyl alcohol monomeric repeat units and vinyl acetate monomeric repeat units, the sealing solution comprising (i) water and (ii) a polyol having 3 or more hydroxyl groups; and (b) contacting a second surface of a water-soluble film having an initial thickness less than about 50 μm or about 40 μm and comprising a polyvinyl alcohol copolymer consisting essentially of vinyl alcohol monomeric repeat units and vinyl acetate monomeric repeat units with the sealing solution on the first surface for a time sufficient to form a seal between the first surface and the second surface.

EXAMPLES

Burn-Through Time Measurements

The time required for a given test solvent to dissolve through a water-soluble film of a given thickness is determined by the following "burn-through" measurement procedure. A test film of specified thickness is affixed to a piece of paper using tape. A drop of about 50 microliters of a test solvent (e.g., water or a sealing solution as disclosed herein) is applied to the test film using a dropper. The test solvent suitably has a food coloring additive or other visual indicator to facilitate observation of the test solvent's action upon the test film. The burn-through time is measured as the time at which the paper underlying the test film becomes damp and/or changes color according to the added visual indicator for the test solvent (i.e., the area around which the drop was placed turns the color of the food coloring or other indicator after the test film has been dissolved ("burned through") by the test solvent).

Film Tensile and Seal Peel Strength Measurements

This methodology is used to determine the tensile force required to tear or peel a water-soluble film (tensile strength) or solution-sealed water-soluble films (seal peel strength). The procedure includes the determination of tensile force and strength. An INSTRON tensile testing apparatus or equivalent is used for the collection of film data. An ESIPROOF proofing apparatus or equivalent with an anilox roller 140/10 is used to secure two sheets of film with solvent (e.g., water or a sealing solution as disclosed herein). A minimum of three test specimens, each cut with reliable cutting tools to ensure dimensional stability and reproducibility, are tested in the machine direction (MD) (where applicable) for each measurement. Tests conducted in the standard laboratory atmosphere of 23±2.0° C. and 35±5% relative humidity.

For peel strength determination, test specimens are prepared by cutting four 4"×12" (10.2 cm×30.5 cm) film sheets with the 12" (30.5 cm) dimension in the machine direction (MD) (where applicable). For two sheets, the four corners are taped to a surface with the film matte surface facing upward (or cast-opposite surface, where applicable). One sheet is overlaid on top of one of the taped sheets so that the matte surfaces are in contact. On top of the other taped sheet, the remaining sheet on is placed top so that the gloss side is contacted with the matte surface. One 4" (10.2 cm) end of each top sheet is taped to secure it to the bottom sheet. The loose end of each top sheet is threaded through the ESIPROOF proofing roller using the 140/10 anilox roller. An amount of 0.5 mL of the test sealing solution (e.g., water or an aqueous solvent solution) is applied to the doctor blade. The roller is pulled at a constant speed (3" per second) to coat the upper film and to secure it to the lower sheet. The film is allowed to weld for a period of about 10 minutes to 15 minutes, thereby forming a seal but leaving two unsealed (free) film flaps on one end of the test specimen for subsequent peel testing. For tensile strength determination, 1"-wide (2.54 cm) samples of a single (unsealed) film sheet having the same thickness as that for the peel strength films are prepared. The sealed or unsealed sample is then transferred to the INSTRON tensile testing machine to proceed with testing while minimizing exposure in the 35% relative humidity environment. The tensile testing machine is prepared according to the manufacturer instructions, equipped with a 500 N load cell, and calibrated. The correct grips and faces are fitted.

For the peel test, there is a 0.50" (1.27 cm) separation between the rubber grips, all four of which are flat and square. Three (or more) 1"-wide (2.54 cm) samples are cut in the machine direction (MD). The unsealed flaps of each sample is placed in the grips of the testing machine, taking care to ensure that the specimen is aligned with the grips and parallel to them, and that the specimen is not pulled too tightly in the tester's jaws. The load is balanced and the test is initiated according to the instructions of the equipment manufacturer. At the end of the test, the tensile force (in N) required to tear or separate the layers is recorded as the peel strength. Similarly, for tensile strength, three (or more) 1"-wide (2.54 cm) single sheet samples are mounted into the tensile testing machine and analyzed to determine the film peak strength (in N).

Examples 1-5

A common technique for high speed converting of water-soluble films is the use of rotary drum style converting equipment where water is typically used as a sealing solution to slightly wet the lidding film as it is applied and the seal is formed under slight pressure using rollers. Important properties for the sealing solution include a combination of burn-through resistance (i.e., to prevent damage to and/or dissolution of the water-soluble film) and the ability to form a good seal as represented by sealing strength measured by seal peak strength (or load) or seal peak load ratio (as a ratio of the film peak strength). The burn-through resistance becomes more important in smaller gauge films (e.g., 1.5 mil thickness films) typically used to deliver solids (e.g., powder) products. Desirably, a film-sealing solution combination attains a minimum suitable burn-through time and a maximum seal strength.

Examples 1-5 evaluate five different PVOH-based water-soluble films as a function of sealing solution concentration, using water alone as a control sealant and variable-concentration glycerin-in-water solutions (generally spanning 2.5 wt. % to 50 wt. %) according to the disclosure. For each film-sealing solution combination, burn-through times and seal peel strength were tested for 1.5 mil thickness films. Result graphs and data are shown in FIGS. 3-7 and Tables 1-5 for Examples 1-5, respectively. A summary of the specific results for the different test films is provided below. In particular, the PVOH-based films exhibited improved (increased) burn-through times with increasing glycerin concentration. Moreover, the PVOH homopolymer films exhibited substantial improvement in seal peel strength using glycerin-in-water sealing solutions while simultaneously achieving a burn-through time increase sufficient to exceed a minimum desirable threshold of about 45-50 sec.

Example 1

1.5 mil Film A Including PVOH Copolymer A

Burn-through time increased with increasing glycerin concentration. No statistical difference for the peel strength was observed in the range of 0% to 35% glycerin solution. This range is where the maximum seal peak load is observed. There is data at 25% where it is statistically different from the range of 0 to 35%. However, this is a single point and not a trend. Hence, a sealing solution using only water can be used to obtain a good seal. Water alone also has an acceptable minimum burn-through resistance of about 79 seconds.

TABLE 1

Burn-Through Time and Peel Strength for Film A

| Sealing Solution | Burn Through, sec (95% CI) | Peel Strength, N (95% CI) | Film Peak Load, N | Seal Peak Load, N | Peak Load Ratio |
|---|---|---|---|---|---|
| 100% Water | 78.85 (5.45) | 14.63 (1.00) | 33.86 | 14.63 | 0.43 |
| 2.5% Glycerin | 77.10 (4.12) | 13.51 (1.86) | 33.86 | 13.51 | 0.40 |
| 5% Glycerin | 94 (9.67) | 12.96 (1.46) | 33.86 | 12.96 | 0.38 |
| 10% Glycerin | 115 (8.18) | 14.79 (1.14) | 33.86 | 14.79 | 0.44 |
| 15% Glycerin | 212 (14.73) | 13.30 (1.41) | 33.86 | 13.30 | 0.39 |
| 20% Glycerin | 295 (22.99) | 16.15 (1.60) | 33.86 | 16.15 | 0.48 |
| 25% Glycerin | 399 (29.99) | 12.91 (1.07) | 33.86 | 12.91 | 0.38 |
| 30% Glycerin | 652 (26.90) | 13.30 (1.09) | 33.86 | 13.30 | 0.39 |
| 35% Glycerin | | 13.46 (1.39) | 33.86 | 13.46 | 0.40 |
| 40% Glycerin | | 12.45 (0.61) | 33.86 | 12.45 | 0.37 |
| 45% Glycerin | | 12.95 (0.67) | 33.86 | 12.95 | 0.38 |
| 50% Glycerin | | 12.65 (0.76) | 33.86 | 12.65 | 0.37 |

Example 2

1.5 mil Film B Including PVOH Copolymer B

Burn-through time increased with increasing glycerin concentration. No statistical difference for the peel strength was observed in the range of 0% to 25% glycerin solution. This range is where the maximum seal peak load is observed. There is data at 10% where it is statistically different from the range of 0 to 35%. However, this is a single point and not a trend. Hence, a sealing solution using only water can be used to obtain a good seal. Water alone also has an acceptable minimum burn-through resistance of about 80 seconds.

TABLE 2

Burn-Through Time and Peel Strength for Film B

| Sealing Solution | Burn Through, sec (95% CI) | Peel Strength, N (95% CI) | Film Peak Load, N | Seal Peak Load, N | Peak Load Ratio |
|---|---|---|---|---|---|
| 100% Water | 79.5 (7.13) | 10.16 (1.43) | 32.81 | 10.16 | 0.31 |
| 2.5% Glycerin | 92.30 (7.58) | 11.47 (2.01) | 32.81 | 11.47 | 0.35 |

TABLE 2-continued

Burn-Through Time and Peel Strength for Film B

| Sealing Solution | Burn Through, sec (95% CI) | Peel Strength, N (95% CI) | Film Peak Load, N | Seal Peak Load, N | Peak Load Ratio |
|---|---|---|---|---|---|
| 5% Glycerin | 111 (9.82) | 11.19 (1.97) | 32.81 | 11.19 | 0.34 |
| 10% Glycerin | 122 (10.92) | 14.31 (1.85) | 32.81 | 14.31 | 0.44 |
| 15% Glycerin | 268.5 (17.76) | 11.55 (1.85) | 32.81 | 11.55 | 0.35 |
| 20% Glycerin | | 11.67 (1.01) | 32.81 | 11.67 | 0.36 |
| 25% Glycerin | | 9.67 (1.48) | 32.81 | 9.67 | 0.29 |
| 30% Glycerin | | 7.43 (0.70) | 32.81 | 7.43 | 0.23 |
| 35% Glycerin | | 9.77 (0.67) | 32.81 | 9.77 | 0.30 |
| 40% Glycerin | | 5.20 (0.75) | 32.81 | 5.20 | 0.16 |
| 45% Glycerin | | 3.14 (0.75) | 32.81 | 3.14 | 0.10 |
| 50% Glycerin | | 2.12 (0.57) | 32.81 | 2.12 | 0.06 |

Example 3

1.5 mil Film C Including PVOH Copolymer C

Burn-through time increased with increasing glycerin concentration. No statistical difference for the peel strength was observed in the range of 0% to 20% glycerin solution. This is where the maximum seal peak load is observed. There is data at 15% where it is statistically different from the range of 0 to 35%. However, this is a single point and not a trend. Hence, a sealing solution using only water can be used to obtain a good seal. Water alone also has an acceptable minimum burn-through resistance of about 95 seconds.

TABLE 3

Burn-Through Time and Peel Strength for Film C

| Sealing Solution | Burn Through, sec (95% CI) | Peel Strength, N (95% CI) | Film Peak Load, N | Seal Peak Load, N | Peak Load Ratio |
|---|---|---|---|---|---|
| 100% Water | 95.4 (4.74) | 10.83 (1.79) | 48.79 | 10.83 | 0.22 |
| 2.5% Glycerin | 106.6 (7.85) | 10.55 (2.34) | 48.79 | 10.55 | 0.22 |
| 5% Glycerin | 153 (8.79) | 11.05 (1.63) | 48.79 | 11.05 | 0.23 |
| 10% Glycerin | 253 (14.21) | 12.96 (1.23) | 48.79 | 12.96 | 0.27 |
| 15% Glycerin | | 13.61 (1.38) | 48.79 | 13.61 | 0.28 |
| 20% Glycerin | | 9.80 (1.60) | 48.79 | 9.80 | 0.20 |
| 25% Glycerin | | 3.29 (0.42) | 48.79 | 3.29 | 0.07 |
| 30% Glycerin | | 2.55 (0.36) | 48.79 | 2.55 | 0.05 |
| 35% Glycerin | | 0.99 (0.11) | 48.79 | 0.99 | 0.02 |
| 40% Glycerin | | 0.26 (0.04) | 48.79 | 0.26 | 0.01 |
| 45% Glycerin | | 0.86 (0.30) | 48.79 | 0.86 | 0.02 |
| 50% Glycerin | | 0.71 (0.09) | 48.79 | 0.71 | 0.01 |

Example 4

1.5 mil Film D Including PVOH Homopolymer D

Burn-through time increased with increasing glycerin concentration. Unlike the various copolymer PVOH films of Examples 1-3, 0% glycerin (or 100% water) does not exhibit the maximum seal peak load. The maximum seal strength is observed in a range from about 10 to 40% glycerin-in-water. This range is where the maximum seal peak load is observed. Importantly, for this homopolymer film, a 100% water sealing solution is not an option for forming a solution seal. While the minimum burn-though resistance at 100% water of 88 seconds is acceptable and a seal can be formed using water alone as the sealant, the peak seal strength is not at its maximum when using 100% water.

TABLE 4

Burn-Through Time and Peel Strength for Film D

| Sealing Solution | Burn Through, sec (95% CI) | Peel Strength, N (95% CI) | Film Peak Load, N | Seal Peak Load, N | Peak Load Ratio |
|---|---|---|---|---|---|
| 100% Water | 87.7 (6.30) | 11.34 (1.78) | 42.26 | 11.34 | 0.27 |
| 2.5% Glycerin | 117.60 (9.12) | 9.77 (1.49) | 42.26 | 9.77 | 0.23 |
| 5% Glycerin | 127 (12.53) | 10.19 (0.73) | 42.26 | 10.19 | 0.24 |
| 10% Glycerin | 138 (12.36) | 14.79 (1.89) | 42.26 | 14.79 | 0.35 |
| 15% Glycerin | 305.4 (20.05) | 12.07 (1.30) | 42.26 | 12.07 | 0.29 |
| 20% Glycerin | 531 (23.48) | 15.50 (1.33) | 42.26 | 15.50 | 0.37 |
| 25% Glycerin | 1006 (29.92) | 14.32 (1.90) | 42.26 | 14.32 | 0.34 |
| 30% Glycerin | | 15.65 (1.22) | 42.26 | 15.65 | 0.37 |
| 35% Glycerin | | 13.81 (1.15) | 42.26 | 13.81 | 0.33 |
| 40% Glycerin | | 14.14 (1.02) | 42.26 | 14.14 | 0.33 |
| 45% Glycerin | | 11.16 (0.93) | 42.26 | 11.16 | 0.26 |
| 50% Glycerin | | 6.87 (1.10) | 42.26 | 6.87 | 0.16 |

Example 5

1.5 mil Film E Including PVOH Homopolymer E

Film E is a water-soluble, edible film including (i) a PVOH homopolymer as a water-soluble polymer (nominal 23 cP solution viscosity and 88% degree of hydrolysis; 100 weight parts per hundred resin (phr)), (ii) xylitol as a sugar alcohol plasticizer (8.52 phr), (iii) sorbitol as a sugar alcohol plasticizer (6.53 phr), (iv) carboxymethylcellulose ether as a sugar alcohol compatibilizer (17.04 phr), (v) glycerin and propylene glycol as liquid plasticizers (36.98 phr combined), and (vi) a surfactant process aid (1.43 phr). Burn-through time increased with increasing glycerin concentration. Unlike the copolymer PVOH films of Examples 1-3, 0% glycerin (or 100% water) does not exhibit the maximum seal peak load. The maximum seal strength is observed in a range from 5 to 20% glycerin solution. This range is where the maximum seal peak load is observed. Importantly, for this homopolymer film, a 100% water sealing solution is not an option for forming a solution seal. Also, the minimum burn-though resistance at 100% water of about 34 seconds is not acceptable. However, at glycerin levels of 5% and above, a minimum burn-through time of 54 seconds or higher is obtained.

TABLE 5

Burn-Through Time and Peel Strength for Film E

| Sealing Solution | Burn Through, sec (95% CI) | Peel Strength, N (95% CI) | Film Peak Load, N | Seal Peak Load, N | Peak Load Ratio |
|---|---|---|---|---|---|
| 100% Water | 34.55 (2.04) | 2.44 (0.81) | 19.92 | 2.44 | 0.12 |
| 2.5% Glycerin | 51.10 (5.02) | 2.10 (0.87) | 19.92 | 2.10 | 0.11 |
| 5% Glycerin | 54 (3.09) | 4.16 (0.92) | 19.92 | 4.16 | 0.21 |
| 10% Glycerin | 62 (4.56) | 3.77 (0.95) | 19.92 | 3.77 | 0.19 |
| 15% Glycerin | 74.5 (6.64) | 4.95 (0.32) | 19.92 | 4.95 | 0.25 |
| 20% Glycerin | 112 (9.91) | 4.93 (0.86) | 19.92 | 4.93 | 0.25 |
| 25% Glycerin | 218 (23.37) | 2.95 (0.38) | 19.92 | 2.95 | 0.15 |
| 30% Glycerin | 443 (27.01) | 0.61 (0.16) | 19.92 | 0.61 | 0.03 |
| 35% Glycerin | 972 (36.34) | 0.65 (0.11) | 19.92 | 0.65 | 0.03 |
| 40% Glycerin | | 1.29 (0.14) | 19.92 | 1.29 | 0.06 |
| 45% Glycerin | | 0.75 (0.24) | 19.92 | 0.75 | 0.04 |
| 50% Glycerin | | 0.69 (0.05) | 19.92 | 0.69 | 0.03 |

Examples 6-11

Analogous to Examples 1-5, Examples 6-11 evaluate a PVOH-based water-soluble film (Film F including PVOH homopolymer F) as a function of sealing solution concentration, using water alone as a control sealant and variable-concentration sealing solutions (generally spanning 2.5 wt. % to 50 wt. %) using diol and polyol solvents. Film F is a water-soluble, edible film with a film peak load of about 20.0 N and including (i) a PVOH homopolymer as a water-soluble polymer (nominal 8 cP solution viscosity and 88% degree of hydrolysis; 100 weight parts per hundred resin (phr)), (ii) xylitol as a sugar alcohol plasticizer (8.52 phr), (iii) sorbitol as a sugar alcohol plasticizer (6.53 phr), (iv) carboxymethylcellulose ether as a sugar alcohol compatibilizer (17.04 phr), (v) glycerin and propylene glycol as liquid plasticizers (36.98 phr combined), and (vi) a surfactant process aid (1.43 phr). The specific solvents used were glycerin (Example 6), 2-methyl-1,3-propanediol (Example 7), propylene glycol (Example 8), mannitol (Example 9), sorbitol (Example 10), and xylitol (Example 11). For each film-sealing solution combination, burn-through times and seal peel strength were tested for 1.5 mil thickness films. Result graphs and data are shown in FIGS. 8-13 and Tables 6-11 for Examples 6-11, respectively.

TABLE 6

Burn-Through Time and Peel Strength for Film F - Glycerin

| Sealing Solution | Burn Through, sec (95% CI) | Peel Strength, N (95% CI) |
|---|---|---|
| 100% Water | 43 (1.52) | 4.18 (0.48) |
| 2.5% Glycerin | 47 (2.48) | 3.73 (0.53) |
| 5% Glycerin | 51 (2.41) | 6.80 (0.46) |
| 10% Glycerin | 61 (1.98) | 4.39 (0.75) |
| 15% Glycerin | 67 (2.70) | 4.61 (0.90) |
| 20% Glycerin | 113 (5.91) | 4.91 (0.58) |
| 25% Glycerin | 171 (10.27) | 3.97 (0.42) |
| 30% Glycerin | 250 (15.29) | 3.74 (0.23) |

TABLE 7

Burn-Through Time and Peel Strength for Film F - MP Diol

| Sealing Solution | Burn Through, sec (95% CI) | Peel Strength, N (95% CI) |
|---|---|---|
| 100% Water | 43 (1.52) | 4.18 (0.48) |
| 2.5% MP Diol | 50 (1.78) | 5.14 (0.96) |
| 5% MP Diol | 52 (1.79) | 5.20 (0.60) |
| 10% MP Diol | 57 (2.17) | 5.22 (0.60) |
| 15% MP Diol | 84 (3.27) | 4.50 (0.32) |
| 20% MP Diol | 97 (3.39) | 3.24 (1.69) |
| 25% MP Diol | 156 (7.23) | 3.43 (1.06) |
| 30% MP Diol | 200 (9.53) | 3.07 (1.12) |
| 35% MP Diol | 320 (23.35) | 1.80 (1.02) |
| 40% MP Diol | 432 (17.51) | 3.61 (1.37) |
| 45% MP Diol | 608 (31.30) | 3.93 (1.19) |
| 50% MP Diol | 654 (28.18) | 2.99 (0.76) |

TABLE 8

Burn-Through Time and Peel Strength for Film F - Propylene Glycol

| Sealing Solution | Burn Through, sec (95% CI) | Peel Strength, N (95% CI) |
|---|---|---|
| 100% Water | 43 (1.52) | 4.18 (0.48) |
| 2.5% Propylene Glycol | 51 (1.75) | 2.91 (0.30) |
| 5% Propylene Glycol | 53 (1.60) | 4.70 (0.37) |
| 10% Propylene Glycol | 61 (3.01) | 4.81 (0.65) |
| 15% Propylene Glycol | 97 (3.87) | 4.58 (0.58) |
| 20% Propylene Glycol | 111 (3.43) | 4.34 (0.14) |
| 25% Propylene Glycol | 175 (7.27) | 4.81 (0.62) |
| 30% Propylene Glycol | 211 (9.25) | 4.45 (0.68) |
| 35% Propylene Glycol | 449 (25.41) | 4.23 (0.85) |
| 40% Propylene Glycol | 434 (16.62) | 3.41 (1.00) |

TABLE 9

Burn-Through Time and Peel Strength for Film F - Mannitol

| Sealing Solution | Burn Through, sec (95% CI) | Peel Strength, N (95% CI) |
|---|---|---|
| 100% Water | 43 (1.52) | 4.18 (0.48) |
| 2.5% Mannitol | 42 (2.01) | 3.01 (0.95) |
| 5% Mannitol | 55 (1.51) | 5.59 (0.95) |
| 10% Mannitol | 67 (3.76) | 4.61 (0.54) |
| 15% Mannitol | 91 (5.10) | 2.91 (0.34) |

TABLE 10

Burn-Through Time and Peel Strength for Film F - Sorbitol

| Sealing Solution | Burn Through, sec (95% CI) | Peel Strength, N (95% CI) |
|---|---|---|
| 100% Water | 43 (1.52) | 4.18 (0.48) |
| 2.5% Sorbitol | 51 (2.84) | 3.92 (0.99) |
| 5% Sorbitol | 50 (2.70) | 6.97 (0.62) |
| 10% Sorbitol | 72 (3.08) | 6.10 (0.34) |
| 15% Sorbitol | 87 (3.87) | 3.50 (0.41) |
| 20% Sorbitol | 107 (4.87) | 3.70 (0.14) |
| 25% Sorbitol | 225 (18.21) | 2.16 (0.58) |
| 30% Sorbitol | 539 (52.46) | 2.04 (0.58) |

TABLE 11

Burn-Through Time and Peel Strength for Film F - Xylitol

| Sealing Solution | Burn Through, sec (95% CI) | Peel Strength, N (95% CI) |
|---|---|---|
| 100% Water | 43 (1.52) | 4.18 (0.48) |
| 2.5% Xylitol | 46 (2.59) | 4.58 (0.36) |
| 5% Xylitol | 48 (2.46) | 5.84 (0.59) |
| 10% Xylitol | 63 (3.41) | 5.63 (0.39) |
| 15% Xylitol | 73 (3.20) | 4.76 (0.37) |
| 20% Xylitol | 126 (5.46) | 4.94 (0.27) |
| 25% Xylitol | 199 (11.70) | 4.25 (0.58) |

Notably, the polyol solvents containing 3, 5, or 6 hydroxyl groups all exhibited substantial improvement in seal peel strength while simultaneously achieving a burn-through time increase sufficient to exceed a minimum desirable threshold of at least about 45-50 sec. In contrast, the diol solvents containing 2 hydroxyl groups, although achieving a burn-through time above an acceptable minimum, did not exhibit improvement in seal peel strength relative to water to the same degree as the polyol solvents.

Table 12 below presents an HSP analysis of the various solvents tested in Examples 6-11 for their solubility radius (Ra) in relation to a PVOH homopolymer as the corresponding polymeric component in the water-soluble film (see Equation (2) above). The values in Table 12 were computed using the Y-MB methodology and the commercially available HSPIP software for implementing the same. From Table 12, it is seen that the polyol solvents observed to have better solution sealing properties as compared to diol solvents similarly have smaller solubility radii relative to PVOH.

TABLE 12

HSP Analysis: PVOH-Solvent Solubility Radii

| Component | HSP Parameter | | | |
|---|---|---|---|---|
| | $\delta_D$ | $\delta_P$ | $\delta_H$ | Ra |
| PVOH | 19.3 | 10.4 | 26.5 | — |
| Glycerin | 18.3 | 11.3 | 28.5 | 3.0 |
| Mannitol | 17.6 | 12.3 | 28.6 | 4.4 |
| Sorbitol | 17.6 | 12.3 | 28.6 | 4.4 |
| Xylitol | 18.0 | 11.9 | 29.2 | 4.0 |
| 2-Methyl-1,3-Propanediol | 17.3 | 9.3 | 21.4 | 6.6 |
| Propylene Glycol | 17.4 | 8.8 | 21.7 | 6.3 |

The foregoing description is given for clearness of understanding only, and no unnecessary limitations should be understood therefrom, as modifications within the scope of the invention may be apparent to those having ordinary skill in the art.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

All patents, publications and references cited herein are hereby fully incorporated by reference. In case of conflict between the present disclosure and incorporated patents, publications and references, the present disclosure should control.

What is claimed:

1. A method for sealing a water-soluble film, the method comprising:
   (a) applying a sealing solution to a first surface of a water-soluble film, the sealing solution comprising
      (i) water, and
      (ii) a polyol having 3 or more hydroxyl groups,
   wherein the sealing solution has a dynamic viscosity ($\mu_s$) less than 1.5 cP as measured at 20° C.; and
   (b) contacting a second surface of a water-soluble film with the sealing solution on the first surface for a time sufficient to form a seal between the first surface and the second surface.

2. The method of claim 1, wherein the polyol is present in the sealing solution in an amount ranging from about 2 wt. % to about 15 wt. %.

3. The method of claim 1, wherein the sealing solution consists essentially of water and one or more polyols each having 3 or more hydroxyl groups.

4. The method of claim 1, wherein the polyol contains 2 to 12 carbon atoms and 3 to 12 hydroxyl groups.

5. The method of claim 1, wherein the polyol is selected from the group consisting of glycerol, erythritol, threitol, arabitol, xylitol, ribitol, mannitol, sorbitol, galactitol, fucitol, iditol, inositol, volemitol, isomalt, maltitol, lactitol, and combinations thereof.

6. The method of claim 1, wherein the dynamic viscosity ranges from about 1 cP to about 1.45 cP.

7. The method of claim 1, wherein:
   (i) the water-soluble film has a burn-through time of about 45 sec or less using water alone as a test solvent; and
   (ii) the water-soluble film has a burn-through time (A) of about 45 sec or more using the sealing solution as a test solvent and (B) greater than the burn-through time using water alone as a test solvent.

8. The method of claim 1, wherein the seal exhibits a peel strength of at least about 12% relative to the peak load of the water-soluble film.

9. The method of claim 1, wherein the seal exhibits a peel strength of at least about 30% greater than that of a corresponding seal formed with water alone.

10. The method of claim 1, wherein the first surface and the second surface each independently have an initial thickness ranging from about 10 μm to about 150 μm.

11. The method of claim 1, wherein the water-soluble film comprises a water-soluble polymer selected from the group consisting of polyvinyl alcohols, polyethyleneimines, polyacrylates, water-soluble acrylate copolymers, polyvinyl pyrrolidones, pullulans, guar gums, xanthan gums, carrageenans, starches, ethoxylated starches, hydroxypropylated starches, polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, copolymers thereof, blends thereof, and combinations thereof.

12. The method of claim 11, wherein the water-soluble polymer has a 4% solution viscosity ranging from about 3 cP to about 27 cP at 20° C.

13. The method of claim 1, wherein the water-soluble film comprises a water-soluble polymer comprising polyvinyl alcohol.

14. The method of claim 13, wherein the water-soluble polymer comprises a polyvinyl alcohol copolymer consisting essentially of vinyl alcohol monomeric repeat units and vinyl acetate monomeric repeat units.

15. The method of claim 13, wherein the polyvinyl alcohol has a degree of hydrolysis ranging from about 75% to about 99%.

16. The method of claim 13, wherein the polyvinyl alcohol has a degree of hydrolysis ranging from about 86.5% to about 89%.

17. The method of claim 1, wherein the first surface and the second surface are from the same water-soluble film.

18. The method of claim 1, wherein the first surface and the second surface are from different water-soluble films.

19. The method of claim 1, wherein contacting the second surface with the first surface comprises at least one of applying pressure to the first surface and the second surface and applying heat to the first surface and the second surface to form the seal.

20. The method of claim 1, wherein the second surface comprises a second sealing solution thereon to be contacted with the first surface when forming the seal.

21. The method of claim 1, wherein:
   (i) the water-soluble film of at least one of the first surface and the second surface defines a volume at least partially enclosing a composition, and
   (ii) forming the seal creates a sealed water-soluble packet containing the composition.

22. The method of claim 21, wherein the composition is selected from the group consisting of human and animal ingestible items, personal care compositions and cleaning compositions.

23. A method for scaling a water-soluble film, the method comprising:
   (a) applying a scaling solution to a first surface of a water-soluble film having an initial thickness less than about 50 μm and comprising a polyvinyl alcohol copolymer consisting essentially of vinyl alcohol monomeric repeat units and vinyl acetate monomeric repeat units, the scaling solution comprising
      (i) water, and
      (ii) a polyol present in the sealing solution in an amount ranging from about 2 wt. % to about 15 wt. %, the polyol being selected from the group consisting of glycerol, erythritol, threitol, arabitol, xylitol, ribitol, mannitol, sorbitol, galactitol, fucitol, iditol, inositol, volemitol, isomalt, maltitol, lactitol, and combinations thereof.
   wherein the scaling solution has a dynamic viscosity ($\mu_s$) less than 1.5 cP as measured al 20° C.; and
   (b) contacting a second surface of a water-soluble film having an initial thickness less than about 50 μm and comprising a polyvinyl alcohol copolymer consisting essentially of vinyl alcohol monomeric repeat units and vinyl acetate monomeric repeat units with the sealing solution on the first surface for a time sufficient to form a seal between the first surface and the second surface.

24. The method of claim 23, wherein the water-soluble film for each of the first surface and the second surface:
   (i) has a degree of hydrolysis ranging from about 86.5% to about 89%; and
   (ii) further comprises: (A) a sugar alcohol plasticizer selected from the group consisting of isomalt. maltitol, sorbitol, xylitol, erythritol, adonitol, dulcitol, pentacrythritol, mannitol, and combinations thereof, (B) a liquid plasticizer selected from the group consisting of glycerin, diglycerin, ethylene glycol, diethylene glycol, triethylene glycol, tetrathylene glycol, propylene glycol, polyethylene glycols up to 400 MW, 2-methyl-1,3-propanediol, and combinations thereof, and (C) a compatibilizing agent selected from the group consisting of cellulose ethers, polysaccharides of pectin, polysaccharides of sodium alginate, modified starches, and combinations thereof.

25. A method for sealing a water-soluble film, the method comprising:
   (a) applying a scaling solution to a first surface of a water-soluble film, the scaling solution comprising
      (i) water, and
      (ii) a solvent for at least one polymeric component of the water-soluble film,
   wherein
   (A) the solvent and the polymeric component have a solubility radius (Ra) of about 5 or less as defined by equation (I):

$$(Ra)^2 = 4(\delta_{DS} - \delta_{D,P})^2 + (\delta_{P,X} - \delta_{P,P})^2 + (\delta_{H,S} - \delta_{H,P})^2 \quad (I)$$

where $\delta_{DS}$ is the solvent dispersive force, $\delta_{D,P}$ is the polymeric component dispersive force, $\delta_{P,S}$ is the solvent polar force, $\delta_{P,P}$ is the polymeric component polar force, $\delta_{H,S}$ is the solvent hydrogen bonding force, and $\delta_{H,P}$ is the polymeric component hydrogen bonding force, each of which is determined by a consistent method of Hansen solubility parameter evaluation, and
   (B) the sealing solution has a dynamic viscosity ($\mu_s$) less than 1.5 cP as measured at 20° C.; and
   (b) contacting a second surface of a water-soluble film with the sealing solution on the first surface for a time sufficient to form a seal between the first surface and the second surface.

26. The method of claim 25, wherein the solubility radius ranges from about 1 to about 5.

27. The method of claim 25, wherein:
   (i) the polymeric component comprises polyvinyl alcohol;
   (ii) $\delta_{P,S}$ is at least about 10; and
   (iii) $\delta_{H,S}$ is at least about 22.

28. The method of claim wherein the solvent is present in the scaling solution in an amount ranging from about 2 wt. % to about 15 wt. %.

29. The method of claim 25, wherein the scaling solution consists essentially of water and one or more solvents each having a solubility radius of about 5 or less relative to the polymeric component.

* * * * *